US012671926B2

(12) United States Patent
Cai et al.

(10) Patent No.: US 12,671,926 B2

(45) Date of Patent: Jun. 30, 2026

(54) CONTROL METHOD AND ELECTRONIC DEVICE

(71) Applicant: HUAWEI TECHNOLOGIES CO., LTD., Shenzhen (CN)

(72) Inventors: Shuanglin Cai, Xi'an (CN); Haowei Xu, Xi'an (CN); Wei Dong, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 315 days.

(21) Appl. No.: 18/555,728

(22) PCT Filed: Mar. 29, 2022

(86) PCT No.: PCT/CN2022/083852

§ 371 (c)(1),
(2) Date: Oct. 17, 2023

(87) PCT Pub. No.: WO2022/222714

PCT Pub. Date: Oct. 27, 2022

(65) Prior Publication Data

US 2024/0205577 A1 Jun. 20, 2024

(30) Foreign Application Priority Data

Apr. 23, 2021 (CN) ......................... 202110442804.7

(51) Int. Cl.
*H04R 1/02* (2006.01)
*H04R 3/00* (2006.01)

(52) U.S. Cl.
CPC ............. *H04R 1/028* (2013.01); *H04R 3/002* (2013.01); *H04R 2201/02* (2013.01); *H04R 2420/01* (2013.01)

(58) Field of Classification Search
CPC .......... H04R 1/028; H04R 1/023; H04R 3/00; H04R 3/002; H04R 2201/02; H04R 2420/01; G06F 3/167; G06F 2200/1636; G06F 3/017
See application file for complete search history.

(56) References Cited

U.S. PATENT DOCUMENTS

| | | | | |
|---|---|---|---|---|
| 2007/0079206 | A1* | 4/2007 | Arora | G06F 3/038 714/745 |
| 2017/0199716 | A1* | 7/2017 | Khaira | G06F 3/0304 |
| 2018/0173280 | A1* | 6/2018 | Katukia | G06F 3/0488 |

FOREIGN PATENT DOCUMENTS

| | | |
|---|---|---|
| CN | 103218062 A | 7/2013 |
| CN | 103729056 A | 4/2014 |
| CN | 106484088 A | 3/2017 |

(Continued)

*Primary Examiner* — Jason R Kurr

(57) ABSTRACT

A control method and an electronic device are provided. The electronic device generates vibration when performing at least one function. The electronic device includes an acceleration sensor and a feedback circuit. The acceleration sensor is configured to output acceleration data, and the feedback circuit is configured to collect and feed back data related to the vibration. The electronic device obtains, based on a variation of a magnitude of the obtained acceleration data and interference data, a variation obtained after data processing, and performs action recognition. The electronic device performs a corresponding function based on a recognition result, or controls a second electronic device to perform a corresponding function.

14 Claims, 13 Drawing Sheets

(56) References Cited

FOREIGN PATENT DOCUMENTS

| | | | |
|---|---|---|---|
| CN | 106648421 | A | 5/2017 |
| CN | 106681592 | A | 5/2017 |
| CN | 107544686 | A | 1/2018 |
| CN | 108509116 | A | 9/2018 |
| CN | 110896511 | A | 3/2020 |
| CN | 112129399 | A | 12/2020 |
| EP | 3588266 | A1 | 1/2020 |

* cited by examiner

CONTROL METHOD AND ELECTRONIC DEVICE

CROSS-REFERENCE TO RELATED APPLICATIONS

This application is a National Stage of International Application No. PCT/CN2022/083852, filed on Mar. 29, 2022, which claims priority to Chinese Patent Application No. 202110442804.7, filed on Apr. 23, 2021. Both of the aforementioned applications are hereby incorporated by reference in their entireties.

TECHNICAL FIELD

This application relates to the field of electronic devices, and in particular, to a control method and an electronic device.

BACKGROUND

With rapid development of electronic devices, it becomes a development trend for the electronic devices to be integrated with more and more functions. For example, a smart speaker is integrated with a lighting function and has a light strip. As shown in FIG. 1, a touch light strip on/off button 101 is disposed on a smart speaker 100 having a light strip 102. A user may control, by performing a touch operation on the light strip on/off button 101, turning on/turning off of the light strip 102 of the smart speaker 100. In this way, no light or fewer lights may be disposed near the smart speaker. This can save space occupation, and therefore, is popular in the marketplace. However, this causes a large quantity of buttons on an electronic device. Some buttons are used to control original functions of the electronic device, and some buttons are used to control new functions integrated into the electronic device. For example, some buttons on the smart speaker are used to control original functions such as volume control and playback pause, and some buttons are used to control an integrated light strip on/off function. In this way, there are excessive buttons. Consequently, it is inconvenient for the user to use the buttons, and user experience is poor. For example, when a corresponding button is searched for and located, time consumption is increased, especially when some buttons that are not frequently used are searched for and located. For a smart speaker integrated with a light strip, in a scenario with dim light or even no light, for example, at night, it takes a long time for the user to search for and locate a light strip on/off button, resulting in low efficiency. Alternatively, when a friend of the user visits a home of the user, it also takes a long time to search for related buttons one by one to control turning on/turning off of the light strip of the smart speaker. In this way, operation flexibility of the electronic device is low. In addition, excessive buttons compromise aesthetics of the electronic device.

SUMMARY

To resolve the foregoing technical problem, embodiments of this application provide a control method and an electronic device. According to the technical solutions provided in this application, time consumption for searching for and locating a corresponding button is shortened, and even there is no need to search for and locate the corresponding button, thereby improving operation flexibility of the electronic device and improving user experience. In addition, according to the technical solutions provided in this application, when performing an original function, the electronic device can also accurately recognize an integrated new function to be used by a user, and eliminate interference caused by the original function to accurately recognize and use the new function.

According to a first aspect, a control method is provided. The method includes the following. A first electronic device obtains a variation of a magnitude of acceleration data and interference data based on a time delay between feeding back data by a feedback circuit that is included in the first electronic device and that is used to collect and feed back data related to vibration and performing at least one function, and the acceleration data output by an acceleration sensor included in the first electronic device, where the vibration is generated when the first electronic device performs the at least one function. The first electronic device obtains, based on the variation of the magnitude of the acceleration data and the interference data, a variation obtained after data processing. In this way, the first electronic device performs action recognition based on the variation obtained after data processing; and the first electronic device performs a corresponding function based on a recognition result; or the first electronic device controls, based on a recognition result, a second electronic device to perform a corresponding function.

The feedback circuit may be a circuit configured to collect data that is output when at least one first function is performed. For example, when the first electronic device is a speaker, the feedback circuit may further include a circuit from a PA that is of the speaker and that is connected to a player to a processor through an ADC.

In this way, the electronic device may recognize, by using the disposed acceleration sensor, a slap action performed by a user on the electronic device, and may perform a corresponding function based on the slap action. In other words, the user can implement corresponding control by slapping the electronic device. This reduces operation complexity, improves operation flexibility of the electronic device, and improves user experience. In addition, a physical button used to control a related function does not need to be disposed on the electronic device, so that aesthetics of an appearance design of the electronic device is improved. In addition, the disposed feedback circuit may collect data generated when the electronic device generates vibration by performing the function. Data processing is performed, based on the data, on the acceleration data collected by the acceleration sensor. In a scenario in which these functions are performed, impact of the data collected by the feedback circuit on accuracy of recognizing a slap action can be eliminated, and incorrect recognition can be avoided, so that accuracy of controlling the smart speaker is improved.

According to a first aspect, that a first electronic device obtains a variation of a magnitude of acceleration data and interference data based on the acceleration data and a time delay between feeding back data by a feedback circuit and performing at least one function means receiving an input in response to the first electronic device, or means performing the at least one function in response to the first electronic device. In this way, when an input of the user is received or the foregoing at least one function is performed, action recognition is triggered, to reduce power consumption of the electronic device.

According to any one of the first aspect or the foregoing implementations of the first aspect, that a first electronic device obtains a variation of a magnitude of acceleration data and interference data may include: The first electronic device obtains the variation of the magnitude of the acceleration data and the interference data in real time. In this way, action recognition can be performed in real time, so that a slap action of the user can be timely responded to.

According to any one of the first aspect or the foregoing implementations of the first aspect, that the first electronic device performs action recognition based on the variation obtained after data processing may include: The first electronic device performs action recognition in real time based on the variation obtained after data processing. In this way, a slap action of the user can be timely responded to.

According to any one of the first aspect or the foregoing implementations of the first aspect, that the first electronic device performs action recognition based on the variation obtained after data processing is in response to a prerequisite that the variation obtained after data processing meets a preset condition. In this way, action recognition is triggered when the preset condition is met, so that power consumption of the electronic device can be reduced, and electric power can be saved.

According to any one of the first aspect or the foregoing implementations of the first aspect, the preset condition is as follows: At a moment t, a first variation that is of a magnitude of an acceleration of the first electronic device on an XOY plane of a preset coordinate system and that is obtained after the first electronic device performs data processing is greater than a first preset threshold; or at a moment t, a second variation that is of a magnitude of an acceleration of the first electronic device on a Z-axis of a preset coordinate system and that is obtained after the first electronic device performs data processing is greater than a second preset threshold; or at a moment t, a first variation that is of a magnitude of an acceleration of the first electronic device on an XOY plane of a preset coordinate system and that is obtained after the first electronic device performs data processing is greater than a first preset threshold, and at the moment t, a second variation that is of a magnitude of an acceleration of the first electronic device on a Z-axis of the preset coordinate system and that is obtained after the first electronic device performs audio cancellation is greater than a second preset threshold, where the moment t is a moment that meets a preset requirement after a timing start point.

According to any one of the first aspect or the foregoing implementations of the first aspect, the moment t that meets the preset requirement is greater than or equal to t1, where t1 is a corresponding moment at which M is equal to preset M1, M is a quantity of pieces of acceleration data that are output by the acceleration sensor starting from the timing start point, one piece of the acceleration data may be represented as $[\bar{a}_x, \bar{a}_y, \bar{a}_z](t)$, and the timing start point is a moment at which the first electronic device is powered on.

According to any one of the first aspect or the foregoing implementations of the first aspect, when M is equal to preset M1, an average value $[\bar{a}_x, \bar{a}_y, \bar{a}_z](t)$ of the acceleration data of the first electronic device is obtained through calculation based on M pieces of acceleration data; or when M is greater than preset M1, an average value $[\bar{a}_x, \bar{a}_y, \bar{a}_z](t+1)$ of the acceleration data of the first electronic device at a moment (t+1) is obtained through calculation by using Formula 3 and the average value $[\bar{a}_x, \bar{a}_y, \bar{a}_z](t)$ of the acceleration data of the first electronic device at the moment t, and Formula ③ is as follows:

$$[\bar{a}_x, \bar{a}_y, \bar{a}_z]^{(t+1)} = \omega \cdot [\bar{a}_x, \bar{a}_y, \bar{a}_z]^{(t)} + (1-\omega) \cdot [a_x, a_y, a_z]^{(t)}. \quad ③$$

In Formula ③, 0<ω<1; ω is preset;

$$a_x^{(t)},\ a_y^{(t)},\ \text{and } a_z^{(t)}$$

respectively represent magnitudes of accelerations of the first electronic device at the moment t in an X-axis direction, a Y-axis direction, and a Z-axis direction of the preset coordinate system; and $$\bar{a}_x^{(t)},\ \bar{a}_y^{(t)},\ \text{and } \bar{a}_z^{(t)}$$

respectively represent average values of magnitudes of accelerations of the first electronic device at the moment t in three directions, namely, an X-axis direction, a Y-axis direction, and a Z-axis direction, of a predefined coordinate system.

According to any one of the first aspect or the foregoing implementations of the first aspect, a variation of a magnitude of acceleration data of the first electronic device at the moment t is decomposed into a variation $$d_{xy}^{(t)}$$

of the magnitude of the acceleration of the first electronic device on the XOY plane of the predefined coordinate system at the moment t, and a variation $$d_z^{(t)}$$

of the magnitude of the acceleration of the first electronic device on the Z-axis of the predefined coordinate system at the moment t; and the two variations are respectively obtained through calculation by using Formula $\hat{1}$ and Formula $\hat{2}$, where Formula $\hat{1}$ and Formula $\hat{2}$ are respectively as follows:

$$d_{xy}^{(t)} = \sqrt{\left(a_x^{(t)} - \bar{a}_x^{(t)}\right)^2 + \left(a_y^{(t)} - \bar{a}_y^{(t)}\right)^2}\text{; and} \quad ①$$

$$d_z^{(t)} = \sqrt{\left(a_z^{(t)} - \bar{a}_z^{(t)}\right)^2}. \quad ②$$

According to any one of the first aspect or the foregoing implementations of the first aspect, the interference data at the moment t is obtained through calculation by using Formula ⑥, and Formula $\hat{6}$ is as follows:

$$e'^{(t)} = \max\left(e^{(t-p)}, e^{(t-p+1)}, \ldots, e^{(t-k)}\right) \quad ⑥$$

In Formula $\hat{6}$, max represents taking a maximum value, $e'^{(t)}$ represents interference data obtained after the maximum value is taken, $e^{(t-p)}$, $e^{(t-p+1)}$, and $e^{(t-k)}$ represents energy of data output by the first electronic device when the first electronic device performs the at least one function at moments from a moment (t−p) to a moment (t−k); and p is used to reflect past duration starting from the moment (t−k).

$e^{(t-k)}$ is obtained through calculation by using Formula 5, and Formula 5 is as follows:

$$e^{(t-k)} = \frac{1}{m}\sum_{i=1}^{m}(s_i - \overline{s})^2 \quad (5)$$

In Formula $\hat{5}$, $e^{(t-k)}$ represents energy of data output by the first electronic device when the first electronic device performs the at least one function in duration from a moment (t-k−1) to the moment (t−k);

$$\overline{s} = \frac{1}{m}\sum_{i=1}^{m}(s_i),$$

and represents an average value of $s_1, s_2, \ldots, s_m$; m represents a ratio of a sampling frequency of the output data to a backhaul frequency; and $s_i$ represents an $i^{th}$ sampling value obtained by sampling the output data in duration from the moment (t−k) to the moment t. The energy of data output when the at least one function is performed in a period of time before the moment t is used to eliminate impact on the acceleration sensor at the moment t, thereby further improving accuracy of action recognition.

According to any one of the first aspect or the foregoing implementations of the first aspect, the variation obtained after data processing at the moment t includes: a variation $$d'^{(t)}_{xy}$$

that is of the magnitude of the acceleration of the first electronic device on the XOY plane at the moment t and that is obtained after the first electronic device performs data processing, and a variation $$d'^{(t)}_{z}$$

of the magnitude of the acceleration of the first electronic device on the Z-axis at the moment t, where $$d'^{(t)}_{xy}$$

is obtained through calculation by using Formula $\hat{7}$, and Formula $\hat{7}$ is as follows:

$$d'^{(t)}_{xy} = d^{(t)}_{xy} - e'^{(t)}. \quad (7)$$

$$d'^{(t)}_{z}$$

is obtained by using Formula $\hat{8}$;

$$d'^{(t)}_{z} = d^{(t)}_{z} - e'^{(t)}. \quad (8)$$

According to any one of the first aspect or the foregoing implementations of the first aspect, the variation obtained after data processing at the moment t includes: a variation $$d'^{(t)}_{xy}$$

that is of the magnitude of the acceleration of the first electronic device on the XOY plane at the moment t and that is obtained after the first electronic device performs data processing, where $$d'^{(t)}_{xy}$$

is obtained through calculation by using Formula $\hat{7}$, and Formula $\hat{7}$ is as follows:

$$d'^{(t)}_{xy} = d^{(t)}_{xy} - e'^{(t)}. \quad (7)$$

According to any one of the first aspect or the foregoing implementations of the first aspect, if $$d'^{(t)}_{xy}$$

is greater than the first preset threshold, and $$d'^{(t)}_{z}$$

is greater than the second preset threshold, the first electronic device performs action recognition based on the variation obtained after data processing.

According to any one of the first aspect or the foregoing implementations of the first aspect, if $$d'^{(t)}_{xy}$$

is greater than the first preset threshold, the first electronic device performs action recognition based on the variation obtained after data processing.

According to any one of the first aspect or the foregoing implementations of the first aspect, action recognition is performed by using Function (1) and Function (2); and Function (1) and Function (2) are respectively as follows:

$$\begin{cases} d'^{(t+i)}_{xy} - d'^{(t+i-1)}_{xy} > T_{slap} \\ d'^{(t+i)}_{xy} - d'^{(t+i+1)}_{xy} > T_{slap} \end{cases}; \text{and} \quad \text{Function (1)}$$

$$\overline{s}_{xy} > T_{move-xy}. \quad \text{Function (2)}$$

In Function (1) and Function (2), $T_{slap}>0$, $T_{move-xy}>0$, and both $T_{slap}$ and $$\bar{s}_{xy} = \frac{1}{n}\sum_{i=1}^{n}\left(d'^{(t+i)}_{xy}\right),$$

and is an accumulated value of all data in $T_{move-xy}$ are preset values; and $$\left[d'^{(t+1)}_{xy}, d'^{(t+2)}_{xy} \ldots d'^{(t+n)}_{xy}\right].$$

According to any one of the first aspect or the foregoing implementations of the first aspect, action recognition is performed by using Function (1), Function (2), and Function (3); and Function (1), Function (2), and Function (3) are respectively as follows:

$$\begin{cases} d'^{(t+i)}_{xy} - d'^{(t+i-1)}_{xy} > T_{slap} \\ d'^{(t+i)}_{xy} - d'^{(t+i+1)}_{xy} > T_{slap} \end{cases}; \quad \text{Function (1)}$$

$$\bar{s}_{xy} > T_{move-xy}; \text{ and} \quad \text{Function (2)}$$

$$\bar{s}_{z} > T_{move-z}. \quad \text{Function (3)}$$

In Function (1), Function (2), and Function (3), $T_{slap}>0$, $T_{move-xy}>0$, $T_{move-z}>0$, and $T_{slap}$, $T_{move-xy}$, and $T_{move-z}$ are all preset values;

$$\bar{s}_{xy} = \frac{1}{n}\sum_{i=1}^{n}\left(d'^{(t+i)}_{xy}\right),$$

and is an accumulated value of all data in $$\left[d'^{(t+1)}_{xy}, d'^{(t+2)}_{xy} \ldots d'^{(t+n)}_{xy}\right];$$

and $$\bar{s}_{z} = \frac{1}{n}\sum_{i=1}^{n}\left(d'^{(t+i)}_{z}\right),$$

and is an accumulated value of all data in $$\left[d'^{(t+1)}_{z}, d'^{(t+2)}_{z} \ldots d'^{(t+n)}_{z}\right].$$

According to any one of the first aspect or the foregoing implementations of the first aspect, when $$\bar{s}_{xy} < T_{move-xy},\ d'^{(t+i)}_{xy} - d'^{(t+i-1)}_{xy} > T_{slap}, \text{ and } d'^{(t+i)}_{xy} - d'^{(t+i-1)}_{xy} > T_{slap},$$

a recognition result is that a slap action is received; and if $\bar{s}_z>T_{move-z}$, a recognition result is a horizontal movement.

According to any one of the first aspect or the foregoing implementations of the first aspect, when $$\bar{s}_{z} < T_{move-z},\ \bar{s}_{xy} < T_{move-xy},\ d'^{(t+i)}_{xy} - d'^{(t+i-1)}_{xy} > T_{slap},$$
$$\text{and } d'^{(t+i)}_{xy} - d'^{(t+i-1)}_{xy} > T_{slap},$$

a recognition result is a horizontal movement; and if $\bar{s}_z>T_{move-z}$, a recognition result is a vertical movement.

According to any one of the first aspect or the foregoing implementations of the first aspect, the first electronic device includes a speaker, the speaker is integrated with a lighting function, and that the first electronic device performs a corresponding function includes: starting the lighting function. For the speaker integrated with the lighting function, the speaker may be controlled to start lighting by slapping the speaker, so that the user can control the lighting function in a scenario with poor light, for example, at night. This greatly improves user experience.

According to a second aspect, a first electronic device is provided. The first electronic device may include a processor, a memory, and a computer program, where the computer program is stored in the memory. When the computer program is executed by the processor, the first electronic device is enabled to perform the method according to any one of the first aspect or the implementations of the first aspect.

Any one of the second aspect or the implementations of the second aspect corresponds to any one of the first aspect or the implementations of the first aspect. For technical effects corresponding to any one of the second aspect or the implementations of the second aspect, refer to technical effects corresponding to any one of the first aspect or the implementations of the first aspect. Details are not described herein again.

According to a third aspect, a computer-readable storage medium is provided. The computer-readable storage medium includes a computer program. When the computer program is run on a first electronic device, the first electronic device is enabled to perform the method according to any one of the first aspect or the implementations of the first aspect.

Any one of the third aspect or the implementations of the third aspect corresponds to any one of the first aspect or the implementations of the first aspect. For technical effects corresponding to any one of the third aspect or the implementations of the third aspect, refer to technical effects corresponding to any one of the first aspect or the implementations of the first aspect. Details are not described herein again.

According to a fourth aspect, a computer program product is provided. When the computer program product runs on a computer, the computer is enabled to perform the method according to any one of the first aspect or the implementations of the first aspect.

Any one of the fourth aspect or the implementations of the fourth aspect corresponds to any one of the first aspect or the implementations of the first aspect. For technical effects corresponding to any one of the fourth aspect or the implementations of the fourth aspect, refer to technical effects corresponding to any one of the first aspect or the implementations of the first aspect. Details are not described herein again.

DESCRIPTION OF EMBODIMENTS

Terms used in the following embodiments are merely intended to describe specific embodiments, but are not intended to limit this application. The terms "one", "a", "the", "the foregoing", "this", and "the one" of singular forms used in this specification and the appended claims of this application are also intended to include expressions such as "one or more", unless otherwise specified in the context clearly. It should be further understood that in the following embodiments of this application, "at least one" and "one or more" mean one or more than two (including two). The term "and/or" is used to describe an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects.

Reference to "an embodiment", "some embodiments", or the like described in this specification indicates that one or more embodiments of this application include a specific feature, structure, or characteristic described with reference to the embodiment. Therefore, statements such as "in one embodiment", "in some embodiments", "in some other embodiments", and "in still some other embodiments" that appear in this specification and differ from each other do not necessarily refer to a same embodiment; instead, it means "one or more, but not all, embodiments", unless otherwise specifically emphasized in another manner. The terms "include", "comprise", "have", and their variants all mean "include but are not limited to", unless otherwise specifically emphasized in another manner. The term "connection" includes direct connection and indirect connection, unless otherwise specified.

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more features.

In embodiments of this application, the word "example", "for example", or the like is used to represent giving an example, an illustration, or a description. Any embodiment or design solution described as "example" or "for example" in embodiments of this application should not be explained as being more preferred or having more advantages than another embodiment or design solution. Exactly, use of the word "example", "for example", or the like is intended to present a related concept in a specific manner.

Figure 1:
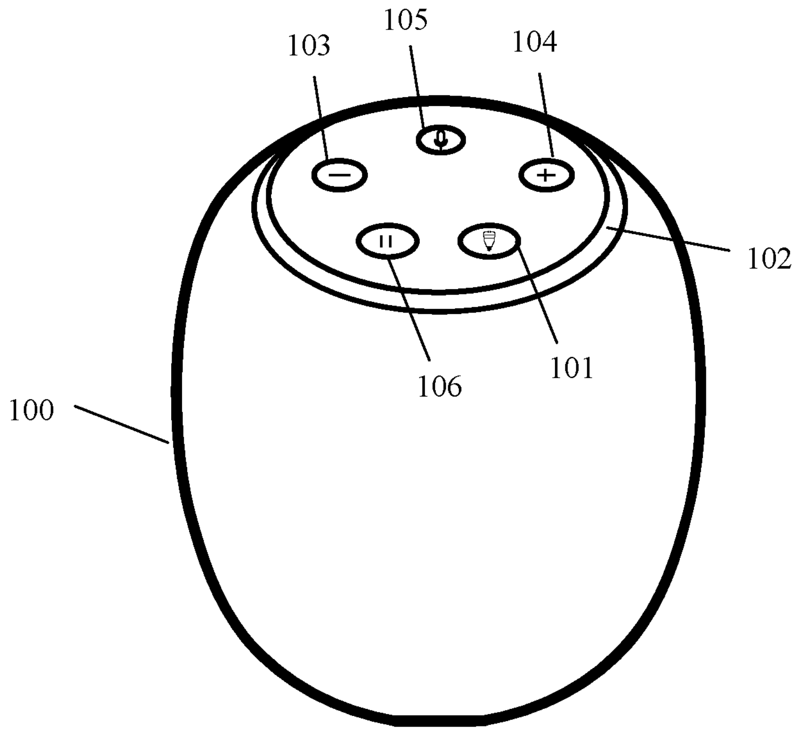
FIG. 1 is a schematic diagram of an example of a smart speaker integrated with a lighting function according to an embodiment of this application.

It becomes a development trend for the electronic devices to be integrated with more and more functions. For example, the smart speaker is integrated with a lighting function by using a disposed light strip. A user may perform an operation on a corresponding button disposed on the smart speaker, to control turning on/turning off of the light strip. However, this causes a large quantity of buttons on an electronic device. Some buttons are used to control original functions of the electronic device, and some buttons are used to control new functions integrated into the electronic device. For example, refer to FIG. 1. A smart speaker 100 having a light strip 102 is still used as an example. The smart speaker 100 includes: a light strip on/off button 101, volume adjustment buttons 103 and 104, a microphone mute button 105, and a play pause button 106. The light strip on/off button 101 is configured to control turning on/turning off of the light strip integrated into the smart speaker 100. The volume adjustment buttons 103 and 104, the microphone mute button 105, and the play pause button 106 are respectively configured to control original functions of the smart speaker 100, that is, control decrease or increase of a volume of the smart speaker 100, control mute of a microphone, and control play and pause of music.

In this way, there are excessive buttons. Consequently, it is inconvenient for the user to use the buttons, and user experience is poor. For example, when a corresponding button is searched for and located, time consumption is increased. For a smart speaker integrated with a light strip, in a scenario with dim light or even no light, for example, at night, it takes a long time to search for and locate a light strip on/off button, resulting in low efficiency. In this way, operation flexibility of the electronic device is reduced. In addition, excessive buttons may compromise aesthetics of the electronic device.

An embodiment of this application provides a control method. The control method may be applied to an electronic device on which an acceleration sensor is disposed. The electronic device may recognize, by using the disposed acceleration sensor, a slap action performed by a user on the electronic device, and the electronic device may perform a corresponding function based on the slap action. In this way, the user can implement control on the electronic device by slapping the electronic device. This reduces operation complexity, improves operation flexibility of the electronic device, and improves user experience.

Figure 2:
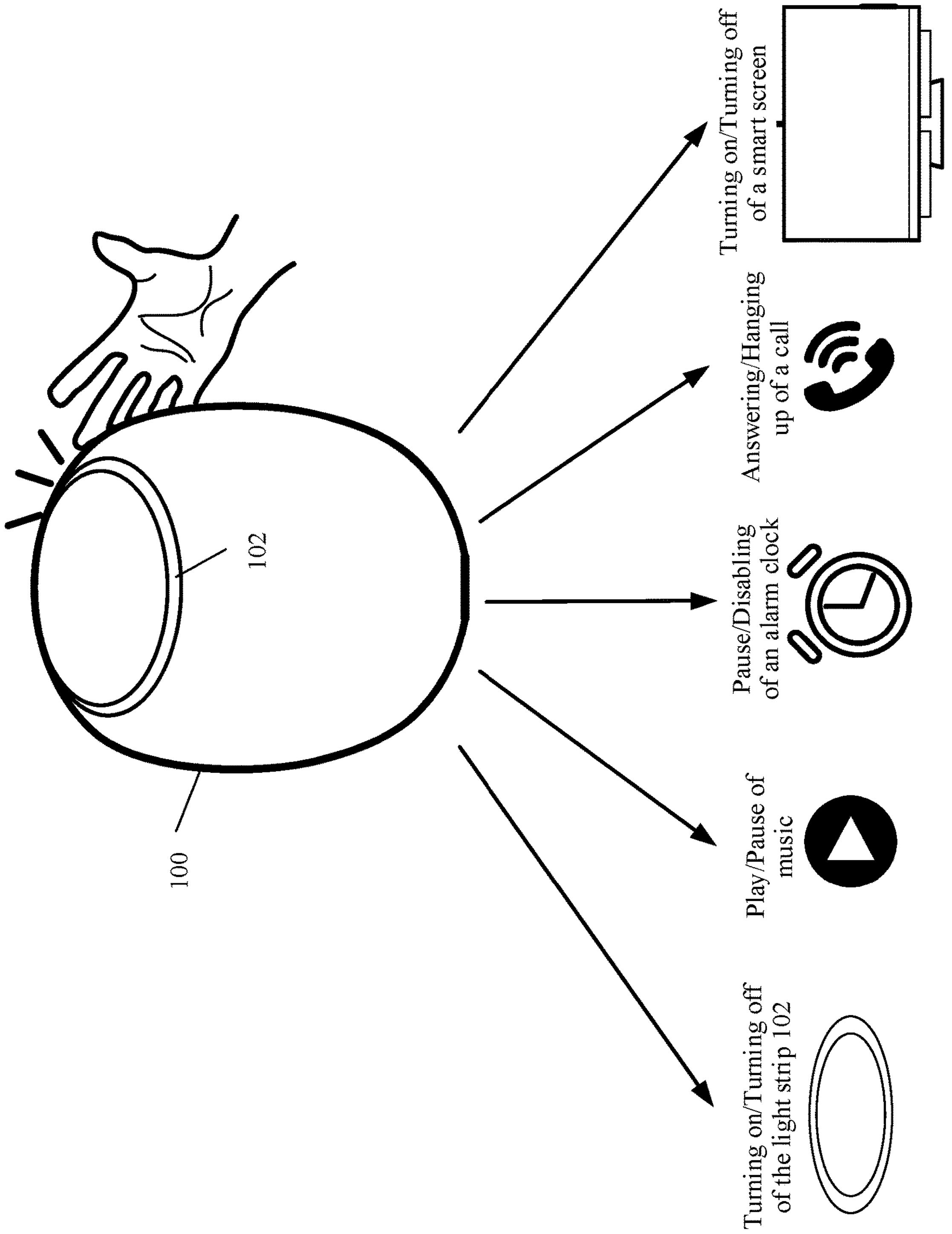
FIG. 2 is a schematic diagram of an example of an application scenario of a control method according to an embodiment of this application.

For example, with reference to FIG. 2, an example in which the electronic device is the smart speaker 100 having the light strip 102 is used. When the user slaps the smart speaker 100, the smart speaker 100 generates vibration, and the vibration causes a change of acceleration data collected by an acceleration sensor of the smart speaker 100. The smart speaker 100 may recognize, based on the change of the acceleration data collected by the acceleration sensor, a slap action performed by the user on the smart speaker 100. After recognizing the slap action of the user, the smart speaker 100 may perform a corresponding function based on the slap action, to implement flexible control on the smart speaker 100. For example, after recognizing the slap action of the user, the smart speaker 100 may control turning on/turning off of the light strip 102 of the smart speaker 100. For another example, the smart speaker 100 controls, based on the recognized slap action, play/pause of music on the smart speaker 100, pause/disabling of an alarm clock on the smart speaker 100, answering/hanging up of a call on the smart speaker 100, or the like. In some other examples, after recognizing the slap action of the user, the smart speaker 100 may further implement control on a smart home device at a home of the user based on the recognized slap action. For example, still with reference to FIG. 2, after recognizing the slap action of the user based on the change of the acceleration data collected by the acceleration sensor, the smart speaker 100 may control turning on/turning off of a smart screen at home. Certainly, the smart speaker 100 may further control another smart home device at home based on the recognized slap action, for example, control turning on/turning off of a light at home, or control turning on/turning off of a vacuum cleaning robot.

It should be noted that although the foregoing shows an example in which the electronic device is the smart speaker 100, the control method provided in this embodiment may be further applicable to another electronic device. In this embodiment, the electronic device may be a device that generates vibration when performing at least one original function. Such an electronic device usually includes a motor, a loudspeaker, and the like. For example, the electronic device is a washing machine, a smart speaker, or an electronic device having a speaker. In some examples, the electronic device may alternatively be a Bluetooth speaker, a smart television, a smart screen, a large screen, a portable computer (like a mobile phone), a handheld computer, a tablet computer, a notebook computer, a netbook, a personal computer (personal computer, PC), an augmented reality (augmented reality, AR)/virtual reality (virtual reality, VR) device, a vehicle-mounted computer, or the like. A specific form of the electronic device in embodiments of this application is not limited.

Figure 3:
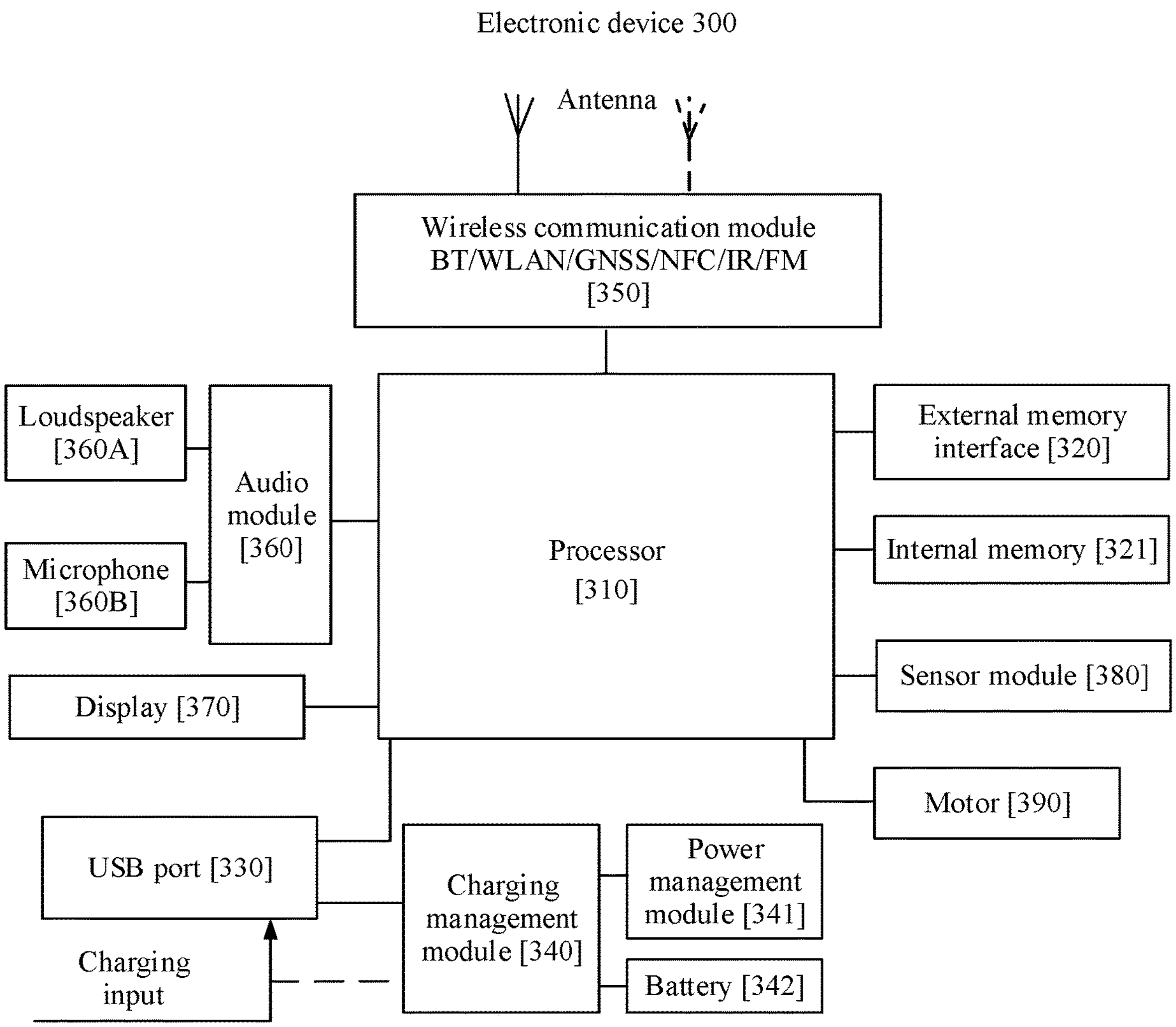
FIG. 3 is a schematic diagram of a structure of an electronic device according to an embodiment of this application.

For example, an electronic device 300 in an embodiment of this application may include a structure shown in FIG. 3. The electronic device 300 may include a processor 310, an external memory interface 320, an internal memory 321, a universal serial bus (universal serial bus, USB) port 330, a charging management module 340, a power management module 341, a battery 342, an antenna, a wireless communication module 350, an audio module 360, a loudspeaker 360A, a microphone 360C, a display 370, a sensor module 380, and the like. The sensor module 380 may include a pressure sensor, a barometric pressure sensor, a magnetic sensor, a distance sensor, an optical proximity sensor, a fingerprint sensor, a touch sensor, an ambient light sensor, an acceleration sensor, and the like.

It may be understood that the structure shown in this embodiment of this application does not constitute a specific limitation on the electronic device 300. In some other embodiments of this application, the electronic device 300 may include more or fewer components than those shown in the figure, or some components may be combined, or some components may be split, or different component arrangements may be used. The components shown in the figure may be implemented by hardware, software, or a combination of software and hardware.

The processor 310 may include one or more processing units. For example, the processor 310 may include an application processor, a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors. In some embodiments, the electronic device 300 may alternatively include one or more processors 310. The controller may generate an operation control signal based on instruction operation code and a time sequence signal, to complete control of instruction reading and instruction execution.

A memory may be further disposed in the processor 310, and is configured to store instructions and data. In some embodiments, the memory in the processor 310 is a cache. The memory may store instructions or data just used or cyclically used by the processor 310. In some embodiments, the processor 310 may include one or more interfaces.

The USB port 330 is an interface that conforms to a USB standard specification, and may be a mini USB port, a micro USB port, a USB type-C port, or the like. The USB port 330 may be configured to be connected to a charger to charge the electronic device 300, or may be configured to transfer data between the electronic device 300 and a peripheral device.

The charging management module 340 is configured to receive a charging input from the charger. The charger may be a wireless charger or a wired charger. When charging the battery 342, the charging management module 340 may further supply power to the electronic device 300 by using the power management module 341.

The power management module 341 is configured to be connected to the battery 342, the charging management module 340, and the processor 310. The power management module 341 receives an input from the battery 342 and/or the charging management module 340, and supplies power to the processor 310, the internal memory 321, the display 370, the wireless communication module 350, and the like. In some other embodiments, the power management module 341 may alternatively be disposed in the processor 310. In some other embodiments, the power management module 341 and the charging management module 340 may alternatively be disposed in a same device.

The antenna is configured to transmit and receive electromagnetic wave signals. Each antenna in the electronic device 300 may be configured to cover one or more communication frequency bands. Different antennas may be multiplexed, to improve antenna utilization.

The wireless communication module 350 may provide a wireless communication solution that is applied to the electronic device 300 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 350 may be one or more components integrating at least one communication processing module. The wireless communication module 350 receives an electromagnetic wave through the antenna, performs frequency modulation and filtering processing on an electromagnetic wave signal, and sends a processed signal to the processor 310. The wireless communication module 350 may further receive a to-be-sent signal from the processor 310, perform frequency modulation and amplification on the signal, and convert the signal into an electromagnetic wave for radiation through the antenna.

The electronic device 300 implements a display function by using the GPU, the display 370, the application processor, and the like. The GPU is configured to perform mathematical and geometric calculation, and render an image. The display 370 is configured to display an image, a video, and the like. In some embodiments, the electronic device 300 may include one or N displays 370, where N is a positive integer greater than 1.

The internal memory 321 may include one or more random access memories (random access memory, RAM), one or more non-volatile memories (non-volatile memory, NVM), or a combination thereof. The random access memory may include a static random access memory (static random-access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, for example, a 5th generation DDR SDRAM is usually referred to as a DDR5 SDRAM), and the like. The non-volatile memory may include a magnetic disk storage device and a flash memory (flash memory). The random access memory may be directly read and written by the processor 310. The random access memory may be configured to store an executable program (for example, a machine instruction) of an operating system or another running program, and may be further configured to store data of a user, data of an application, and the like. The non-volatile memory may also store an executable program and data of a user, data of an application, and the like. The non-volatile memory may be loaded into the random access memory in advance for the processor 310 to directly perform reading and writing.

The external memory interface 320 may be configured to connect to an external non-volatile memory, to extend a storage capability of the electronic device 300. The external non-volatile memory communicates with the processor 310 through the external memory interface 320, to implement a data storage function. For example, files such as music are stored in the external non-volatile memory.

The electronic device 300 may implement audio functions by using the audio module 360, the loudspeaker 360A, the microphone 360B, the application processor, and the like. For example, a music play function and a recording function are implemented.

The audio module 360 is configured to convert digital audio information into an analog audio signal output, and is also configured to convert an analog audio input into a digital audio signal. The audio module 360 may be further configured to encode and decode an audio signal. In some embodiments, the audio module 360 may be disposed in the processor 310, or some functional modules of the audio module 360 are disposed in the processor 310.

The loudspeaker 360A is configured to convert an audio electrical signal into a sound signal. The electronic device 300 may play music by using the loudspeaker 360A.

The microphone 360B, also referred to as a "mike", a "microphone", or the like, is configured to convert a sound signal into an electrical signal. The user may make a sound by moving a human mouth close to the microphone 360B, to input a sound signal to the microphone 360B.

The motor 390 may generate vibration. The motor 390 may be configured to perform vibration such as ringing vibration of an alarm clock, vibration of an incoming call of a smartphone, vibration of an audio output of a smart speaker, and rotation vibration in washing of a washing machine.

The control method provided in this embodiment of this application may be applied to the foregoing electronic device 300. The electronic device 300 includes an acceleration sensor. The acceleration sensor may periodically collect acceleration data of the electronic device 300 based on a specific frequency. For example, the acceleration sensor may collect magnitudes of accelerations of the electronic device 300 in various directions (generally an X-axis direction, a Y-axis direction, and a Z-axis direction).

An example in which the electronic device is a smart speaker is still used for description. When the user slaps the smart speaker, the smart speaker generates vibration, and the vibration causes a change of acceleration data collected by an acceleration sensor of the smart speaker. The smart speaker may recognize, based on the change of the acceleration data collected by the acceleration sensor, a slap action performed by the user on the smart speaker, to perform a corresponding function based on the slap action.

Figure 4:
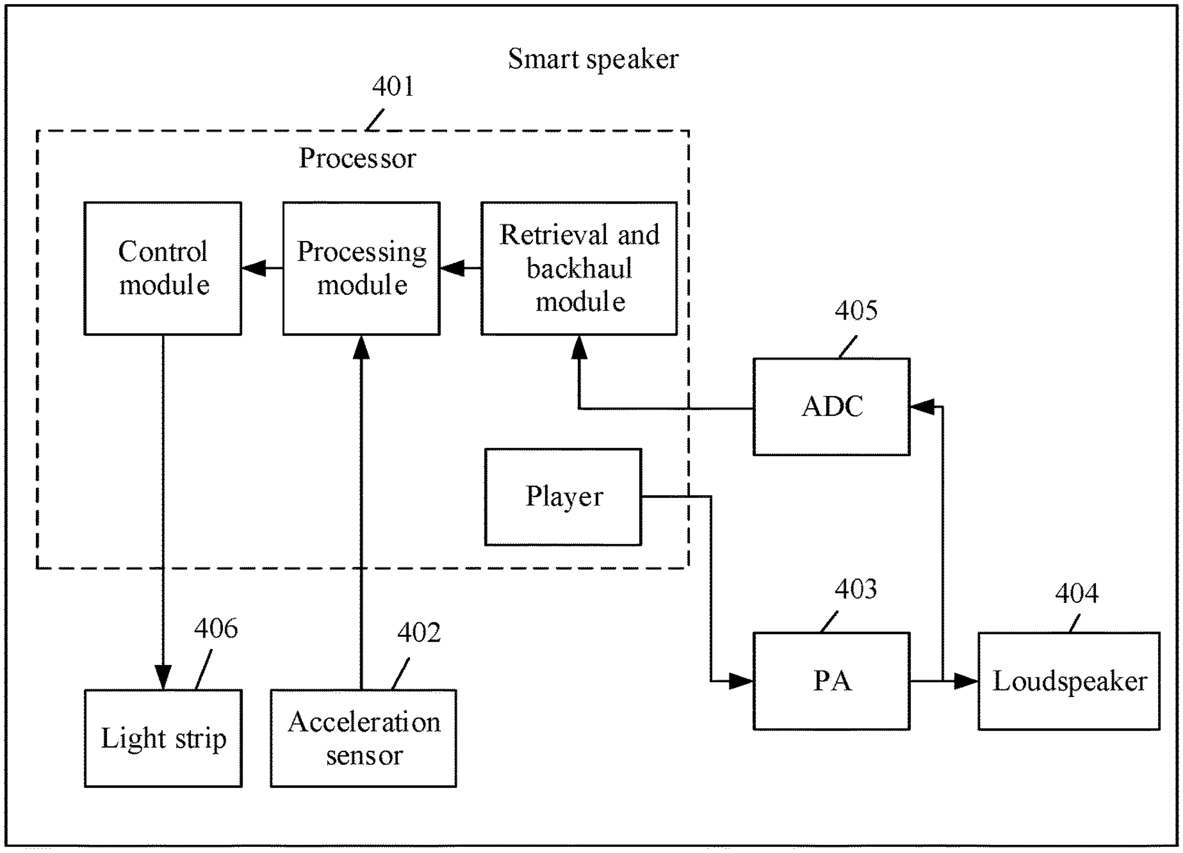
FIG. 4 is a schematic diagram of a structure of a smart speaker according to an embodiment of this application.

In some examples, with reference to FIG. 4, the smart speaker includes a light strip 406, and the slap action is used to control turning on/turning off of the light strip 406 of the smart speaker. The smart speaker further includes an acceleration sensor 402. The acceleration sensor 402 is configured to collect acceleration data of the smart speaker and report the acceleration data to the processor 401 of the smart speaker. When the user slaps the smart speaker, the slap action performed on the smart speaker enables the smart speaker to generate vibration, and the vibration causes a change of the acceleration data collected by the acceleration sensor 402 of the smart speaker. The processor 401 of the smart speaker may recognize the slap action of the user based on a change of the acceleration data collected by the acceleration sensor 402, to control, based on the slap action, turning on/turning off of the light strip 406.

However, when the user plays an audio by using the smart speaker, the smart speaker may also generate vibration, and the vibration also causes a change of acceleration data collected by the acceleration sensor of the smart speaker. If the user performs a slap action on the smart speaker in an audio play scenario, a change of acceleration data generated by vibration of the smart speaker that is caused by the slap action may be interfered with or submerged by a change of acceleration data caused by vibration of the smart speaker that is caused by audio play. Consequently, in the audio play scenario, the slap action of the user cannot be accurately recognized, or in the audio play scenario, the vibration of the smart speaker caused by audio play is incorrectly recognized as the slap action of the user. Therefore, during user gesture recognition, interference data in acceleration data collected by the acceleration sensor needs to be removed, to accurately recognize a slap action of the user, and avoid a case of incorrect recognition, thereby improving accuracy of controlling the smart speaker.

Still with reference to FIG. 4, in the audio play scenario, a player included in the processor 401 of the smart speaker may decode (for example, decode audio data in an MP3 format into a PCM code stream) audio data, amplify the audio data by using a power amplifier (power amplifier, PA) 403, and output the audio data through a loudspeaker 404. In this embodiment, the smart speaker may further include an analog-to-digital converter (analog-to-digital converter, ADC) 405. One end of the ADC 405 is connected to an output end of the PA 403, and the other end of the ADC 405 is connected to the processor 401 of the smart speaker. In the audio play scenario, the processor 401 of the smart speaker may obtain audio data obtained after analog-to-digital conversion is performed by the ADC 405, that is, retrieve audio data output by the smart speaker. A circuit from the PA 403 to the processor 401 through the ADC 405 may be a feedback circuit in this embodiment of this application. In this way, the processor 401 of the smart speaker may remove, from the acceleration data collected by the acceleration sensor 402 and based on the retrieved audio data, interference data generated by vibration of the smart speaker that is caused by audio play, to accurately recognize a slap action of the user, and avoid a case of incorrect recognition.

Figure 5A:
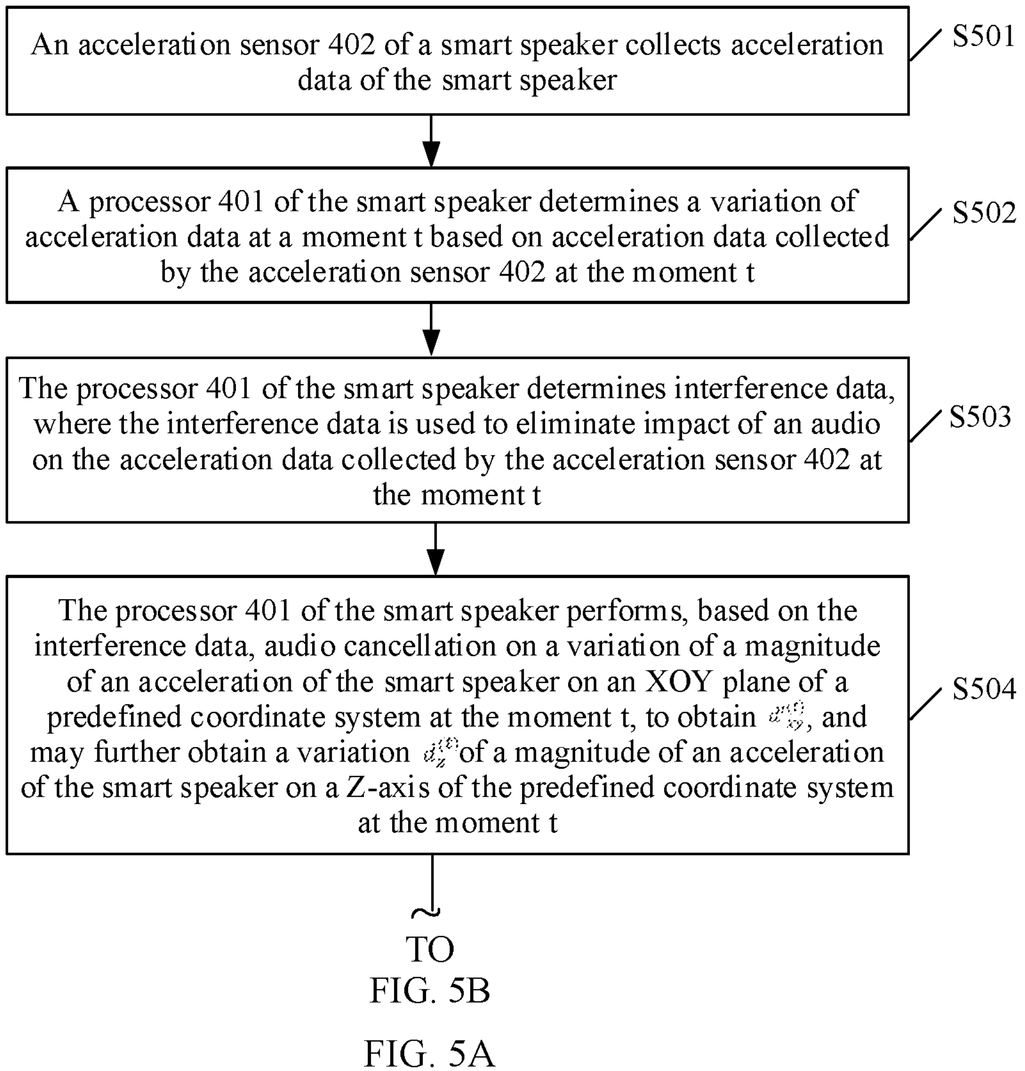
FIG. 5A to FIG. 5C are a schematic flowchart of a control method according to an embodiment of this application.
Figure 5B:
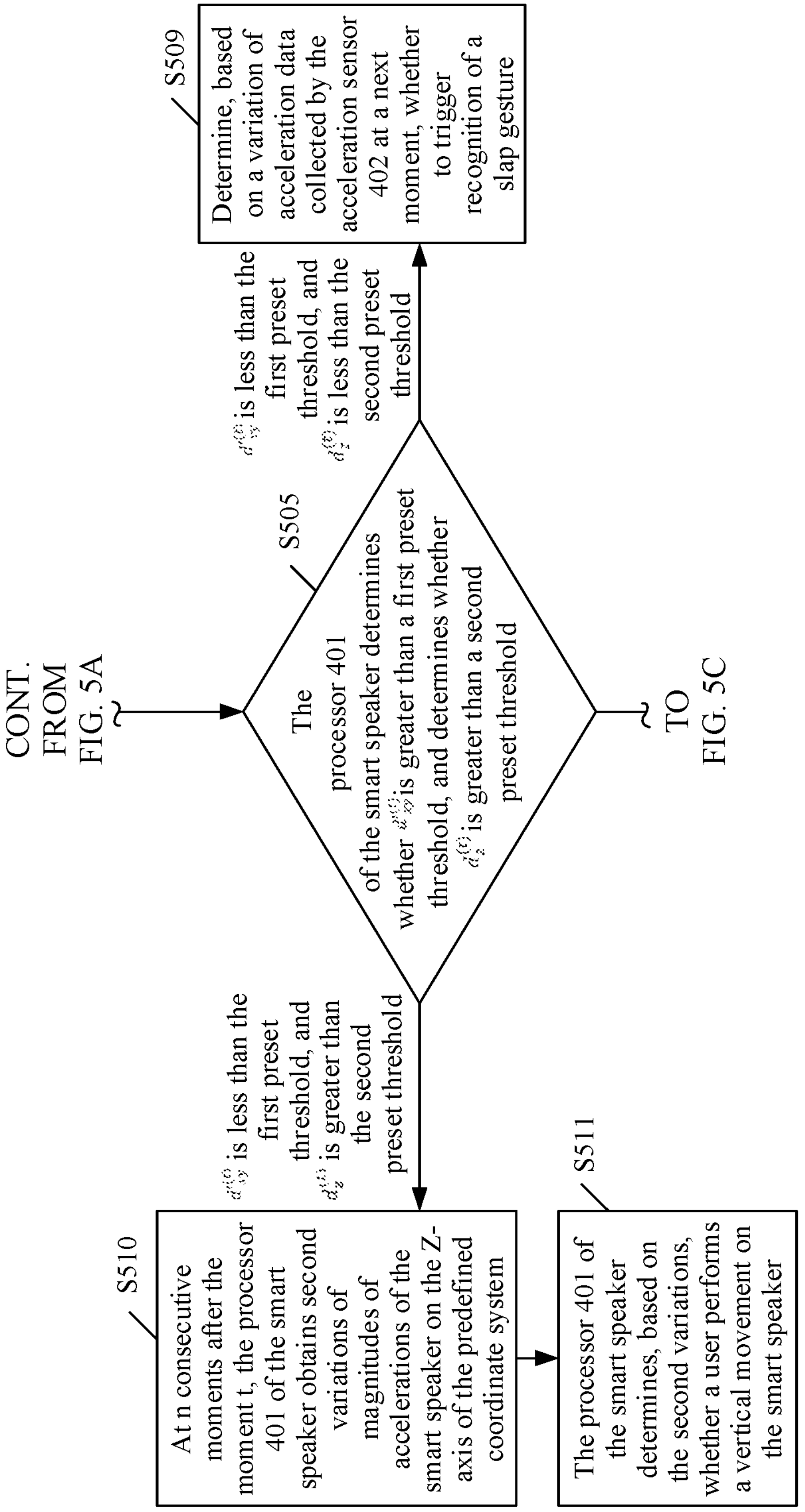
Figure 5C:
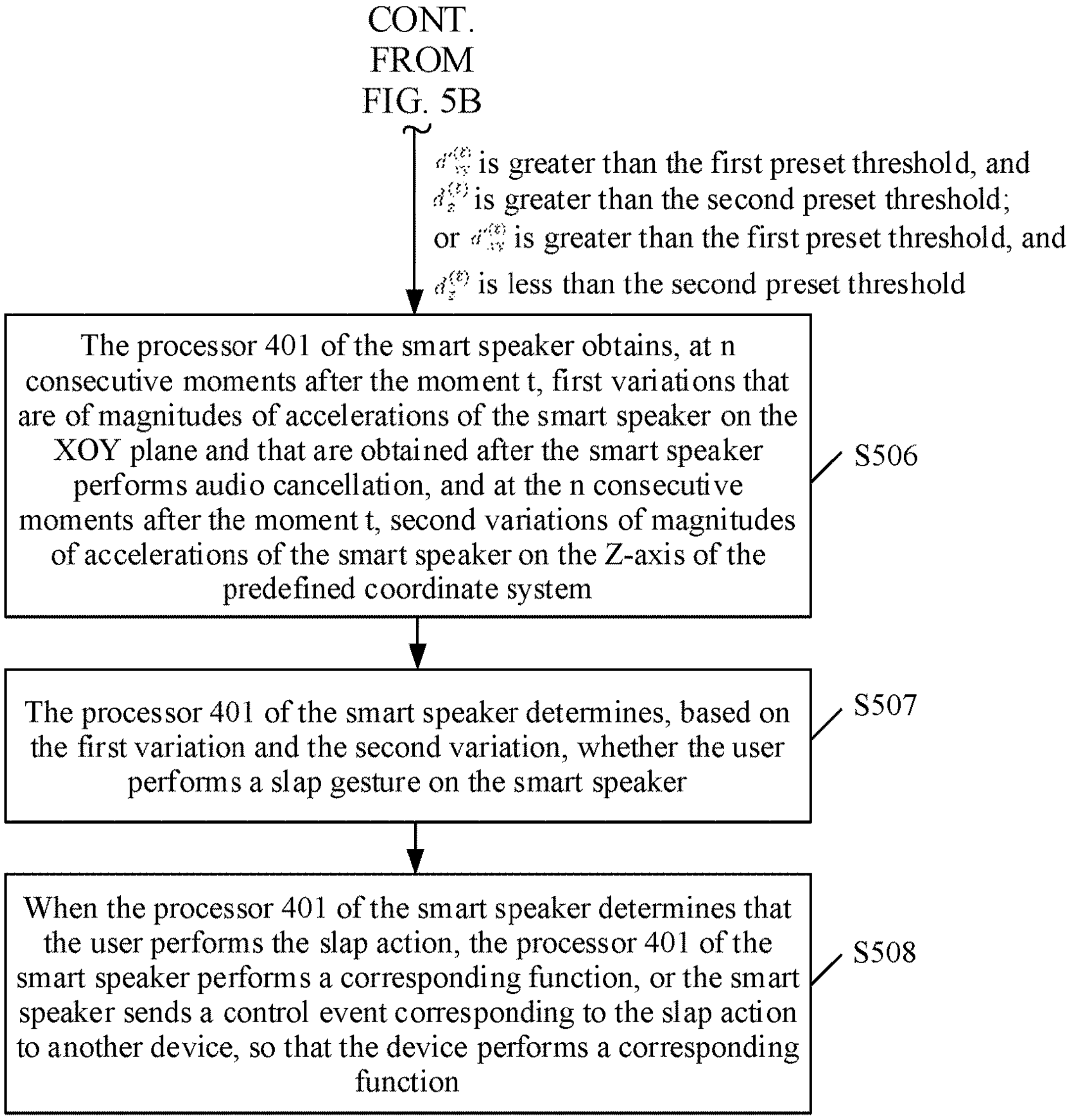

The following describes the control method provided in an embodiment with reference to FIG. 4 and FIG. 5A to FIG. 5C. As shown in FIG. 5A to FIG. 5C, the method may include the following steps.

S501: An acceleration sensor 402 of a smart speaker collects acceleration data of the smart speaker.

The acceleration data may include magnitudes of accelerations of the smart speaker in various directions of a predefined coordinate system.

Figure 6:
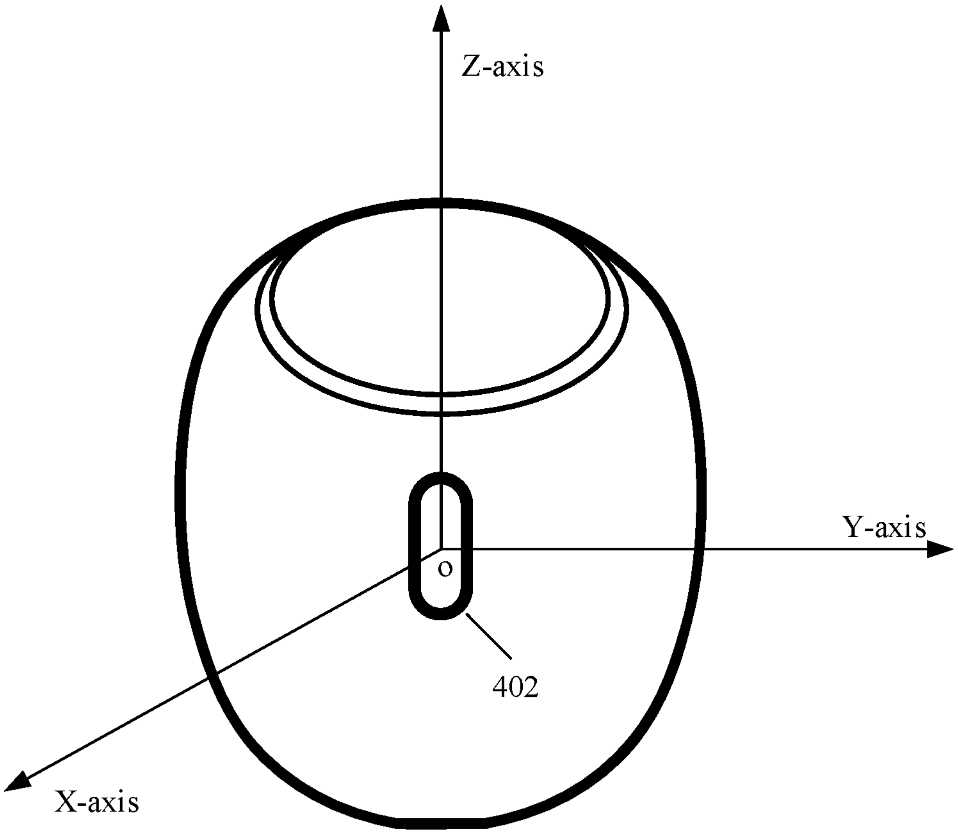
FIG. 6 is a schematic diagram of a coordinate system according to an embodiment of this application.

In some examples, as shown in FIG. 6, the predefined coordinate system may be a coordinate system in which an origin of coordinates is located at a center O of the smart speaker or a center O of the acceleration sensor 402, an XOY plane is parallel to a top cover of the smart speaker, and a Z-axis is perpendicular to the top cover of the smart speaker. For example, the center of the smart speaker or the center of the acceleration sensor 402 of the smart speaker may be a centroid, a space center, or the like. Alternatively, the point O may be any point on the smart speaker or on the acceleration sensor 402 of the smart speaker. The acceleration sensor 402 of the smart speaker may periodically collect (for example, a frequency is 200 Hz, that is, a collection period is 5 ms), based on a specific frequency, magnitudes of accelerations of the smart speaker in three directions, namely, an X-axis direction, a Y-axis direction, and a Z-axis direction, of the coordinate system, to obtain the acceleration data of the smart speaker. For example, with reference to FIG. 7, the acceleration data collected by the acceleration sensor 402 of the smart speaker may be shown in (a) of (A) in FIG. 7.

$[a_x, a_y, a_z](t)$ may represent acceleration data that is of the smart speaker and that is collected by the acceleration sensor 402 at a moment t.

$$a_x^{(t)}$$

represents a magnitude of an acceleration of the smart speaker at the moment t in the X-axis direction of the coordinate system shown in FIG. 6, $$a_y^{(t)}$$

represents a magnitude of an acceleration of the smart speaker at the moment t in the Y-axis direction of the coordinate system shown in FIG. 6, and $$a_z^{(t)}$$

represents a magnitude of an acceleration of the smart speaker at the moment t in the Z-axis direction of the coordinate system shown in FIG. 6.

The acceleration sensor 402 of the smart speaker may store the collected acceleration data in a buffer (buffer).

S502: The processor 401 of the smart speaker determines a variation of the acceleration data at the moment t based on the acceleration data collected by the acceleration sensor 402 at the moment t.

In some examples, the smart speaker may obtain a variation of a magnitude of acceleration data at each moment in real time.

The processor 401 of the smart speaker may obtain, from the buffer, the acceleration data collected by the acceleration sensor 402. For example, with reference to FIG. 4, the processor 401 includes a processing module. After the smart speaker is powered on, the acceleration sensor 402 of the smart speaker outputs acceleration data once at an interval of a predetermined time period (for example, 5 ms or 10 ms, where ms is millisecond). The processing module of the smart speaker may receive the acceleration data. In an implementation, the acceleration sensor 402 may output data to the processing module in an interruption manner. When detecting an interruption, the processing module may read, from the buffer, the acceleration data collected by the acceleration sensor 402. The processing module may read the acceleration data that is of the smart speaker and that is collected by the acceleration sensor 402 at the moment t, namely, $[a_x, a_y, a_z]^{(t)}$ Generally, when a user performs a slap action on the smart speaker, vibration of the smart speaker caused by a slap affects the acceleration sensor on an X-axis, a Y-axis, and a Z-axis of the predefined coordinate system. In most cases, the vibration of the smart speaker caused by the slap has more significant impact on the data collected by the acceleration sensor on the X-axis and the Y-axis of the predefined coordinate system than on the data collected by the acceleration sensor on the Z-axis. In addition, movement (for example, holding up or pushing) of the smart speaker caused by the user also causes vibration of the smart speaker. To avoid impact of the movement on recognition of the slap action, or prevent the movement from being incorrectly recognized as the slap action by the smart speaker, the smart speaker needs to be able to detect a movement operation performed by the user on the smart speaker. Detection of the movement operation may include detection of a horizontal movement (namely, a movement on the XOY plane) and a vertical movement (namely, a movement on the Z-axis). Based on the foregoing reasons, the variation of the acceleration data may be decomposed into variations in two dimensions, namely, the XOY plane and the Z-axis, for processing. In other words, in this embodiment, the variation of the acceleration data at the moment t may include: a variation of the magnitude of the acceleration of the smart speaker on the XOY plane of the predefined coordinate system at the moment t, and a variation of the magnitude of the acceleration of the smart speaker on the Z-axis of the predefined coordinate system at the moment t.

In some examples, the variation of the magnitude of the acceleration of the smart speaker on the XOY plane of the predefined coordinate system at the moment t and the variation of the magnitude of the acceleration of the smart speaker on the Z-axis of the predefined coordinate system at the moment t may be separately calculated by using the following Formula ① and Formula ②:

$$d_{xy}^{(t)} = \sqrt{\left(a_x^{(t)} - \bar{a}_x^{(t)}\right)^2 + \left(a_y^{(t)} - \bar{a}_y^{(t)}\right)^2} \; ①; \text{ and}$$

$$d_z^{(t)} = \sqrt{\left(a_z^{(t)} - \bar{a}_z^{(t)}\right)^2} \; ②.$$

In Formula ① and Formula ②, $$d_{xy}^{(t)}$$

represents the variation of the magnitude of the acceleration of the smart speaker on the XOY plane of the predefined coordinate system at the moment t;

$$d_z^{(t)}$$

represents the variation of the magnitude of the acceleration of the smart speaker on the Z-axis of the predefined coordinate system at the moment t; and $$\bar{a}_x^{(t)}, \bar{a}_y^{(t)}, \text{ and } \bar{a}_z^{(t)}$$

respectively represent average values of magnitudes of accelerations of the smart speaker at the moment t in three directions, namely, the X-axis direction, the Y-axis direction, and the Z-axis direction of the predefined coordinate system. For example, for the variation of the magnitude of the acceleration of the smart speaker on the XOY plane of the predefined coordinate system at the moment t, refer to (c) in (A) in FIG. 7.

In some examples, when the smart speaker is powered on (this moment may be denoted as a moment 0), the processor 401 of the smart speaker may continuously collect acceleration data that is of the smart speaker and that is collected by the acceleration sensor 402 within a period of time. A quantity of pieces of collected acceleration data is denoted as M. In an implementation, a moment at which the processor, the acceleration sensor, and a related component that implements a connection between the processor and the acceleration sensor of the smart speaker are all powered on may be denoted as the moment 0.

When M is less than or equal to preset M1 (for example, M1 may be preset to 100), an average value $[\bar{a}_x, \bar{a}_y, \bar{a}_z]^{(t)}$ of the acceleration data of the smart sound box is an average value of the M pieces of acceleration data.

When M is greater than preset M1, the processor 401 of the smart speaker may determine an average value of acceleration data of the smart speaker at a moment (t+1) by using Formula 3

$$[\bar{a}_x, \bar{a}_y, \bar{a}_z]^{(t+1)} = \omega \cdot [\bar{a}_x, \bar{a}_y, \bar{a}_z]^{(t)} + (1-\omega) \cdot [a_x, a_y, a_z]^{(t)} \; ③.$$

In Formula 3, 0<ω<1, and a typical value of w may be 0.99; $[\bar{a}_x, \bar{a}_y, \bar{a}_z]^{(t+1)}$ is the average value of the acceleration data of the smart speaker at the moment (t+1); and $[\bar{a}_x, \bar{a}_y, \bar{a}_z]^{(t)}$ is the acceleration data that is of the smart speaker and that is collected by the acceleration sensor 402 at the moment t. Correspondingly, an average value of the acceleration data of the smart sound box at the moment t may be accordingly determined.

A unit of "1" in (t+1) is not limited. For example, the unit of "1" in (t+1) may be millisecond (ms), microsecond (μs), or the like, or may be 10 milliseconds (10 ms), 100 milliseconds (100 ms), 10 microseconds (10 μs), 100 microseconds (100 μs), or any other proper unit. In addition, units of k, p, and the like in the following are the same as the unit of "1".

That is, after the smart speaker is powered on, the acceleration sensor of the smart speaker outputs one piece of acceleration data at an interval of T (for example, 5 ms) starting from a moment at which the smart speaker is powered on. When the quantity M of pieces of output acceleration data is less than or equal to preset M1 (for example, 100), an average value of the M pieces of acceleration data is denoted as $[\bar{a}_x, \bar{a}_y, \bar{a}_z]^{(t)}$; and when M is greater than preset M1 (for example, 100), $[\bar{a}_x, \bar{a}_y, \bar{a}_z]^{(t+1)}$ is determined by using Formula ③. Correspondingly, $[\bar{a}_x, \bar{a}_y, \bar{a}_z]^{(t)}$ may also be determined by using Formula ③.

In other words, when t is less than or equal to M1×T, an average value of the M pieces of acceleration data is denoted as $[\bar{a}_x, \bar{a}_y, \bar{a}_z]^{(t)}$; and when t is greater than M1×T, $[\bar{a}_x, \bar{a}_y, \bar{a}_z]^{(t+1)}$ is determined by using Formula ③. Correspondingly, $[\bar{a}_x, \bar{a}_y, \bar{a}_z]^{(t)}$ may also be determined by using Formula ③. In this embodiment, t1 may be a moment M1*T.

Generally, if the user performs a slap action on the smart speaker, a slap on the smart speaker causes a change of acceleration data collected by the acceleration sensor 402. Therefore, the smart speaker may recognize, based on a variation of the acceleration data collected by the acceleration sensor 402, for example, $$d_{xy}^{(t)} \text{ and } d_z^{(t)},$$

whether the user performs the slap action. However, as described in the foregoing embodiment, in the audio play scenario, an audio played by the smart speaker also causes vibration of the smart speaker, and the vibration also causes a change of acceleration data collected by the acceleration sensor 402 of the smart speaker. This affects accuracy of recognizing a slap action, and incorrect recognition may further occur. To eliminate impact of audio play on accuracy of recognizing a slap action and avoid incorrect recognition, interference data generated by vibration of the smart speaker that is caused by audio play needs to be removed from the acceleration data collected by the acceleration sensor 402. Simply speaking, data processing (which may also be referred to as audio cancellation) needs to be performed on the acceleration data collected by the acceleration sensor 402. Therefore, the method provided in this embodiment further includes the following steps.

S503: The processor 401 of the smart speaker determines interference data, where the interference data is used to eliminate impact of an audio on the acceleration data collected by the acceleration sensor 402 at the moment t.

In some examples, the smart speaker may obtain interference data at each moment in real time.

Greater energy (which may also be referred to as power) of an audio output by the smart speaker indicates greater vibration of the smart speaker and greater impact on the acceleration sensor 402. In addition, the impact of the output audio on the acceleration sensor 402 has a delay, and the delay is random within a specific range. Therefore, the processor 401 of the smart speaker may determine the interference data based on the energy of the output audio at each moment in duration from a moment (t−k) to the moment t, to eliminate impact of the output audio on the acceleration data collected by the acceleration sensor 402 at the moment t.

k may be a positive integer greater than or equal to 1. A specific value of k may be preset based on a requirement of an actual application scenario, provided that it is ensured that an audio corresponding to data obtained by a retrieval and backhaul module of the speaker at the moment t includes audio data output by the smart speaker from the moment (t−k) to the moment t. For example, a value of k may be 1. Certainly, the value of k may alternatively be another positive integer.

In some examples, the processor 401 of the smart speaker may determine, based on data obtained by the retrieval and backhaul module at the moment t and audio data output by the smart speaker at a corresponding moment, energy of an audio output by the smart speaker at the moment.

An example in which energy of an audio output at the moment t is determined is used. The processor 401 of the smart speaker may obtain audio data output by the smart speaker at the moment t, and determine, based on the audio data output by the smart speaker at the moment t, the energy of the audio output by the smart speaker at the moment t.

For example, with reference to FIG. 4, the processor 401 of the smart speaker may further include a retrieval and backhaul module. Energy of an audio output by the smart speaker may be determined by the retrieval and backhaul module.

In the audio play scenario, the smart speaker can output audio data. For example, a player of the smart speaker may decode the audio data, amplify the audio data by using the PA 403, and output the audio data through the loudspeaker 404. In this embodiment, in a process in which the smart speaker outputs the audio data, the audio data output from the PA 403 may be retrieved by the ADC 405 at a specific sampling frequency. The retrieval and backhaul module of the smart speaker may obtain, at a specific frequency (which may also be referred to as a data backhaul frequency), the audio data retrieved by the ADC 405. For example, the audio data retrieved by the retrieval and backhaul module of the smart speaker may be shown in (b) in (A) in FIG. 7. Compared with the output audio data, the data received by the retrieval and backhaul module has a delay. Therefore, data obtained by the retrieval and backhaul module from the ADC 405 at the moment t corresponds to audio data output at a moment before the moment t. In some examples, data obtained by the retrieval and backhaul module from the moment t to the moment (t+1) may include audio data output by the smart speaker from the moment (t−1) to the moment t.

Figure 7:
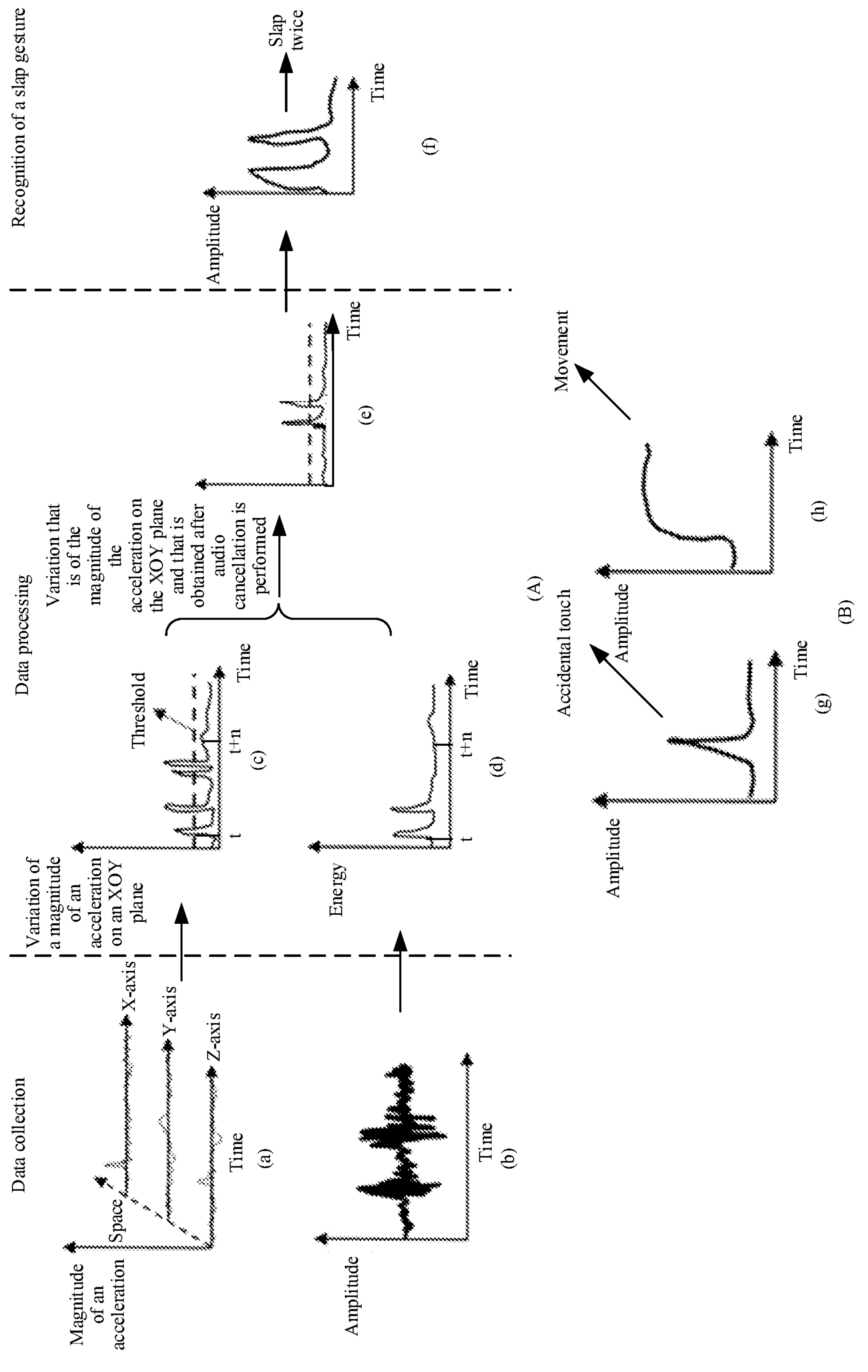
FIG. 7 is a schematic diagram of principles of data collection, data processing, and data recognition performed by a smart speaker according to an embodiment of this application.
Figure 8:
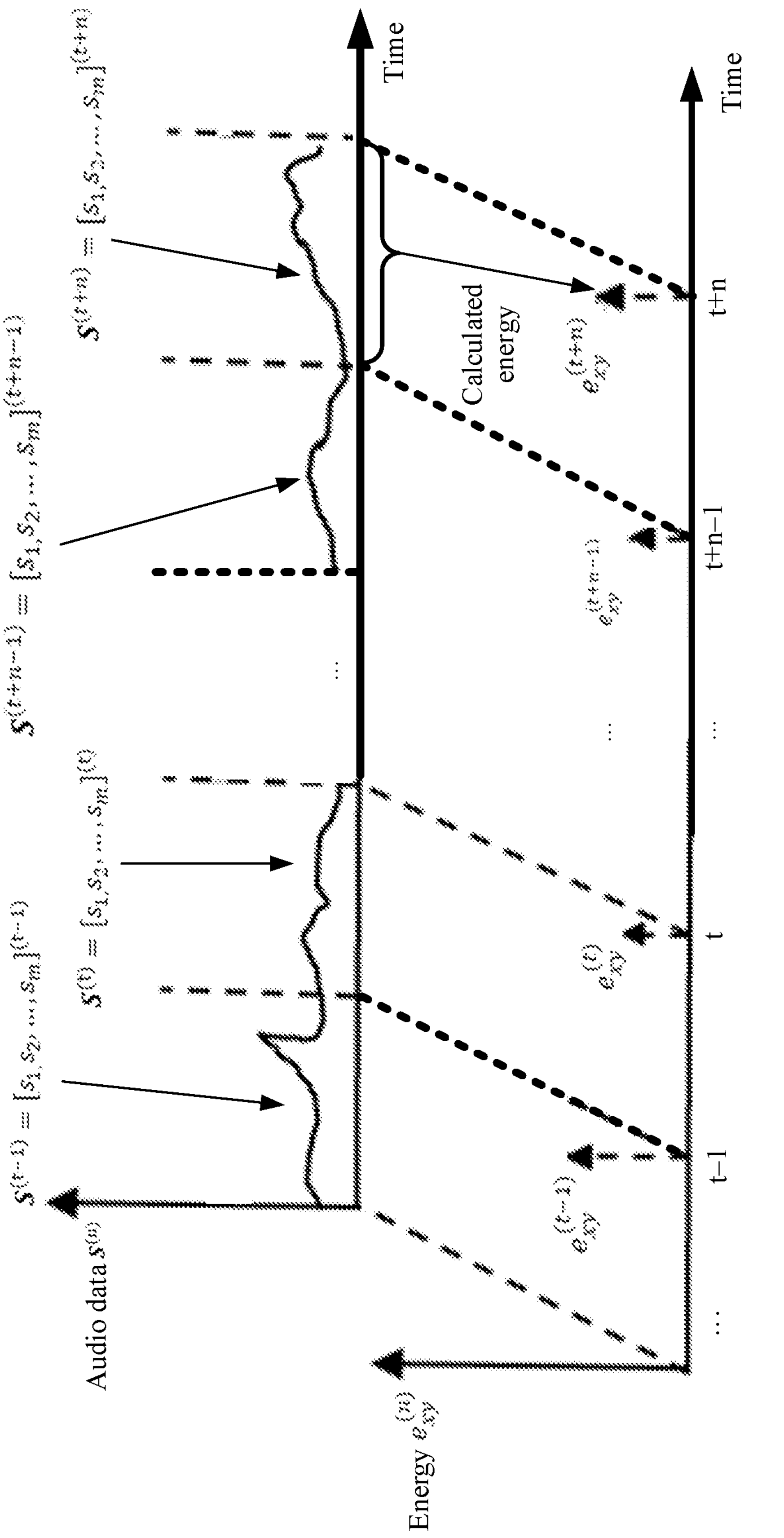
FIG. 8 is a schematic diagram of a principle of sampling an audio data play waveform and calculating a variance in data collection and data processing in FIG. 7.

Generally, a sampling frequency of the ADC 405 for an output waveform of the audio data is higher than a data backhaul frequency of the retrieval and backhaul module. Therefore, the data (the data is obtained after AD conversion is performed on sampling data of the output waveform of the audio data) obtained by the retrieval and backhaul module at the moment t may include a plurality of discrete sampling values. With reference to FIG. 7 and FIG. 8, the data obtained by the retrieval and backhaul module in duration from the moment (t−1) to the moment t may be represented by using the following Formula $\hat{4}$:

$$S^{(t)} = [s_1, s_2, \ldots, s_m]^{(t)} \quad (4).$$

In Formula $\hat{4}$, $S^{(t)}$ represents the data obtained by the retrieval and backhaul module within the duration from the moment (t−1) to the moment t; m is a quantity of discrete sampling values included in the obtained audio data; and $s_1$, $s_2$, . . . , $s_m$ respectively represent m sampling values included in the audio data.

For example, the data backhaul frequency of the retrieval and backhaul module is 200 Hz, the sampling frequency of the ADC 405 for the audio data is 16 KHz, and 16 KHz is divided by 200 Hz, so that m=80 can be obtained. The ADC 405 performs sampling on 16K pieces of audio data within one second. The 16K pieces of data are divided into 200 data packets, and each data packet includes 80 pieces of data. In this case, the foregoing 200 data packets are hauled back to the retrieval and backhaul module within one second. The foregoing 200 data packets may be represented as $S^{(1)}$ to $S^{(200)}$. In other words, one second is divided into 200 moments, and duration between every two moments corresponds to 80 pieces of data.

Then, as shown in FIG. 8, the retrieval and backhaul module of the smart speaker may determine, by calculating a variance of $S^{(t)}$, energy of an audio output by the smart speaker in duration from a moment (t−k−1) to the moment (t−k). For example, the variance of $S^{(t)}$ may be determined by using the following Formula $\hat{5}$:

$$e^{(t-k)} = \frac{1}{m}\sum_{i=1}^{m}(s_i - \bar{s})^2 \quad (5).$$

In Formula $\hat{5}$, $e^{(t-k)}$ represents the energy of the audio output by the smart speaker within the duration from the moment (t−k−1) to the moment (t−k); $e^{(t-k)}$ represents the energy in a form of the variance of $S^{(t)}$; and $$\bar{s} = \frac{1}{m}\sum_{i=1}^{m}(s_i),$$

and is an average value of $s_1$, $s_2$, . . . , $s_m$. In Formula $\hat{5}$, "k" in (t−k) herein is adjustable.

In some other scenarios, k=1. In this case, Formula 5 may be as follows:

$$e^{(t-1)} = \frac{1}{m}\sum_{i=1}^{m}(s_i - \bar{s})^2.$$

Alternatively, the variance of $S^{(t)}$ may be determined by using a formula:

$$e^{(t-k)} = \frac{1}{m-1}\sum_{i=1}^{m}(s_i - \bar{s})^2.$$

Correspondingly, in some other scenarios, the variance of $S^{(t)}$ may be determined by using a formula:

$$e^{(t-1)} = \frac{1}{m-1}\sum_{i=1}^{m}(s_i - \bar{s})^2.$$

Similarly, still with reference to (b) in (A) in FIG. 7, and FIG. 8, the collection and backhaul module of the smart speaker may separately determine, based on data obtained at moments in duration from a moment (t−p+k) to the moment t, energy of audios output by the smart speaker at corresponding moments. For example, $e^{(t-p)}$, $e^{(t-p+1)}$, . . . , $e^{(t-k)}$ respectively represent energy of audios output by the smart speaker at moments in duration from a moment (t−p) to the moment (t−k). The retrieval and backhaul module of the smart speaker may store the determined $e^{(t-p)}$, $e^{(t-p+1)}$, . . . , and $e^{(t-k)}$ in a buffer. In other words, in the buffer, pieces of data that should be obtained by the retrieval and backhaul module of the smart speaker at the moments within the duration from the moment (t−p+k) to the moment t are respectively $e^{(t-p)}$, $e^{(t-p+1)}$, . . . , and $e^{(t-k)}$, where p is used to reflect past duration, and a current result is predicted based on a result of the past duration. For example, p=3. For example, p is mainly used in Formula $\hat{6}$.

For example, when k=1, the retrieval and backhaul module of the smart speaker may separately determine, based on data obtained at moments from a moment (t−p+1) to the moment t, energy of audios output by the smart speaker at moments from a moment (t−p) to the moment (t−1), namely, $e^{(t-p)}$, $e^{(t-p+1)}$, . . . , and $e^{(t-1)}$. The retrieval and backhaul module of the smart speaker may store $e^{(t-p)}$, $e^{(t-p+1)}$, . . . , and $e^{(t-1)}$ in the buffer. In other words, in the buffer, pieces of data that should be obtained by the retrieval and backhaul module of the smart speaker at the moments within the duration from the moment (t−p+1) to the moment t are respectively $e^{(t-p)}$, $e^{(t-p+1)}$, . . . , and $e^{(t-1)}$, $e^{(t-p)}$, $e^{(t-p+1)}$, . . . , and $e^{(t-1)}$ respectively correspond to the energy of the audios output by the smart speaker at the moments from the moment (t−p) to the moment (t−1).

In S503, after obtaining, at the moment t, the acceleration data transmitted by the acceleration sensor 402, the processor 401 (or the processing module) of the smart speaker may read, from the buffer, the data that should be obtained by the retrieval and backhaul module of the smart speaker at the moments within the duration from the moment (t−p+k) to the moment t, that is, obtain $e^{(t-p)}$, $e^{(t-p+1)}$ . . . , and $e^{(t-k)}$; and determine the interference data based on $e^{(t-p+k)}$ $e^{(t-p+1)}$, . . . , and $e^{(t-k)}$.

In some examples, the processor 401 of the smart speaker may determine maximum energy in the energy of the audios output at the moments from the moment (t−p) to the moment (t−k) as the interference data. In other words, the interference data may be determined by using the following Formula $\hat{6}$:

$$e'^{(t)} = \max\left(e^{(t-p)},\ e^{(t-p+1)},\ \ldots,\ e^{(t-k)}\right) \hat{6}.$$

In Formula $\hat{6}$, max represents taking a maximum value, and $e'^{(t)}$ represents the interference data obtained after the maximum value is taken, for example, a highest wave peak in (d) in (A) in FIG. 7. As described above, generally, the vibration of the smart speaker caused by the slap action has more significant impact on the data collected by the acceleration sensor on the X-axis and the Y-axis than on the data collected by the acceleration sensor on the Z-axis. In addition, similarly, generally, the vibration caused by the audio output by the smart speaker is mainly concentrated in the X-axis direction and the Y-axis direction. Therefore, in an implementation, only interference that is caused on the XOY plane by the vibration caused by the output audio and that is to recognition of the slap action may be considered. In other words, in an example, the interference data may be determined by using the foregoing Formula $\hat{6}$. Optionally, k=1.

Optionally, the interference data may alternatively be determined in another manner. For example, average energy in the energy of the audios output at the moments from the moment (t−p) to the moment (t−k) is taken as the interference data. Alternatively, according to a median principle, median energy in the energy of the audios output at the moments from the moment (t-p) to the moment (t−k) is taken as the interference data.

It may be understood that, if the smart speaker does not play an audio or energy of an audio output within a period of time is very small, the determined interference data $e'^{(t)}$ is 0.

It should be noted that, in this embodiment, obtaining the variation of the magnitude of the acceleration data in S502 and obtaining the interference data in S503 may be performed in response to an input (for example, an operation performed by the user on the smart speaker) received by the smart speaker, or may be performed in response to performing a function, for example, audio play, of the smart speaker by the smart speaker. This is not specifically limited in this embodiment.

S504: The processor 401 of the smart speaker performs, based on the interference data, audio cancellation on the variation of the magnitude of the acceleration of the smart speaker on the XOY plane of the predefined coordinate system at the moment t, to obtain $$d'^{(t)}_{xy},$$

and may further obtain the variation $$d^{(t)}_{z}$$

of the magnitude of the acceleration of the smart speaker on the Z-axis of the predefined coordinate system at the moment t.

Audio cancellation on the variation of the magnitude of the acceleration of the smart speaker on the XOY plane at the moment t may be implemented by using the following Formula $\hat{7}$:

$$d'^{(t)}_{xy} = d^{(t)}_{xy} - e'^{(t)}\ \hat{7}.$$

In Formula $\hat{7}$, $$d'^{(t)}_{xy}$$

represents a variation that is of the magnitude of the acceleration of the smart speaker on the XOY plane at the moment t and that is obtained after the smart speaker performs audio cancellation;

$$d_{xy}^{(t)}$$

is the variation that is determined in S502 and that is of the magnitude of the acceleration of the smart speaker on the XOY plane of the predefined coordinate system at the moment t; and $e'^{(t)}$ is the interference data that is determined in S503 and that is of the smart speaker at the moment t. It should be noted that the interference data is not distinguished in two dimensions: the XOY plane and the Z-axis. Therefore, in Formula $\hat{7}$, $e'^{(t)}$ is approximately used as a component that is of the interference data and that is on the XOY plane. It is considered herein that, generally, vibration caused by an audio output by the smart speaker is mainly concentrated in the X-axis direction and the Y-axis direction.

For calculation of $$d_z^{(t)},$$

refer to Formula $\hat{2}$.

Optionally, in S504, the smart speaker may further obtain a variation that is of the magnitude of the acceleration of the smart speaker on the Z-axis at the moment t and that is obtained after the smart speaker performs audio cancellation, namely, $$d_z'^{(t)},$$

and may use the variation of the magnitude of the acceleration for subsequent determining.

$$d_z'^{(t)}$$

may be determined by using a formula:

$$d_z'^{(t)} = d_z^{(t)} - e'^{(t)}.$$

Optionally, S504 includes only "The processor 401 of the smart speaker performs, based on the interference data, audio cancellation on the variation of the magnitude of the acceleration of the smart speaker on the XOY plane of the predefined coordinate system at the moment t", and $$d_z^{(t)}$$

is not obtained.

S505: The processor 401 of the smart speaker determines whether the variation, namely, $$d_{xy}'^{(t)},$$

that is of the magnitude of the acceleration of the smart speaker on the XOY plane of the predefined coordinate system at the moment t and that is obtained after the smart speaker performs audio cancellation is greater than a first preset threshold; and determines whether the variation, namely, $$d_z^{(t)},$$

of the magnitude of the acceleration of the smart speaker on the Z-axis of the predefined coordinate system at the moment t is greater than the second preset threshold.

If $$d_{xy}'^{(t)}$$

is less than the first preset threshold and $$d_z^{(t)}$$

is less than the second preset threshold, it indicates that the user does not slap the smart speaker, and a reason for the change of the acceleration data at the moment t may be the audio output by the smart speaker. In this case, the smart speaker performs S509, that is, may determine, based on a variation of acceleration data collected by the acceleration sensor 402 at a next moment, whether to trigger recognition of a slap action.

It should be noted that S509 is an optional step. The control method provided in an embodiment of this application may include S509, or may not include S509. For example, when S509 is not included, if $$d_{xy}'^{(t)}$$

is less than the first preset threshold and $$d_z^{(t)}$$

is less than the second preset threshold, the smart speaker may not perform an operation.

If $$d_{xy}'^{(t)}$$

is greater than the first preset threshold and $$d_z^{(t)}$$

is greater than the second preset threshold, or $$d_{xy}'^{(t)}$$

is greater than the first preset threshold and $$d_z^{(t)}$$

is less than the second preset threshold, it indicates that a reason for the change of the acceleration data at the moment t may be a slap performed by the user on the smart speaker. In this case, S506 is performed, to further determine whether the user performs a slap action.

If $$d_{xy}'^{(t)}$$

is less than the first preset threshold and $$d_z^{(t)}$$

is greater than the second preset threshold, it indicates that a reason for the change of the acceleration data at the moment t may be that the user performs a vertical movement on the smart speaker. In this case, S510 is performed, to further determine whether the user performs the vertical movement on the smart speaker.

Both the first preset threshold and the second preset threshold may be preset based on experience. For example, a typical value of the first preset threshold may be $1\times10^5$ micrometers per square second (μm/s$^2$). For example, a typical value of the second preset threshold may be $1\times10^5$ micrometers per square second (μm/s$^2$).

In addition, in the foregoing, determining is performed by using the variation, namely, $$d_z^{(t)},$$

of the magnitude of the acceleration of the smart speaker on the Z-axis of the predefined coordinate system at the moment t. In some other embodiments, alternatively, determining may be performed by using the variation, namely, $$d_z'^{(t)},$$

that is of the magnitude of the acceleration of the smart speaker on the Z-axis of the predefined coordinate system at the moment t and that is obtained after the smart speaker performs audio cancellation.

$$d_z'^{(t)}$$

may be determined by using a formula:

$$d_z'^{(t)} = d_z^{(t)} - e'^{(t)}.$$

It should be noted that, in S505, description is provided by using an example in which determining is performed on whether $$d_{xy}'^{(t)}$$

is greater than the first preset threshold and whether $$d_z^{(t)}$$

is greater than the second preset threshold, to determine whether to trigger recognition of the slap action. In some other embodiments, determining may be performed only on whether $$d_{xy}'^{(t)}$$

is greater than the first preset threshold, to determine whether to trigger recognition of the slap action. For example, when it is determined that $$d_{xy}'^{(t)}$$

is greater than the first preset threshold, S506 is performed, to further determine whether the user performs the slap action; or when it is determined that $$d_{xy}'^{(t)}$$

is less than the first preset threshold, S509 is performed. In some other embodiments, alternatively, determining may be performed only on whether $$d_z^{(t)} \text{ or } d_z'^{(t)}$$

is greater than the second preset threshold, to determine whether to trigger recognition of the slap action. For example, when it is determined that $$d_z^{(t)} \text{ or } d_z'^{(t)}$$

is greater than the second preset threshold, S506 is performed, to further determine whether the user performs the slap action; or when it is determined that $$d_z^{(t)} \text{ or } d_z'^{(t)}$$

is less than the second preset threshold, S509 is performed.

Similarly, S509 is an optional step. The control method provided in an embodiment of this application may include S509, or may not include S509.

S506: The processor 401 of the smart speaker obtains, at n consecutive moments after the moment t, first variations that are of magnitudes of accelerations of the smart speaker on the XOY plane and that are obtained after the smart speaker performs audio cancellation; and at the n consecutive moments after the moment t, second variations of magnitudes of accelerations of the smart speaker on the Z-axis of the predefined coordinate system.

After it is determined in S505 that the variation that is of the magnitude of the acceleration of the smart speaker at the moment 1 and that is obtained after the smart speaker performs audio cancellation is greater than the preset threshold, it indicates that the user may perform a slap on the smart speaker, and the smart speaker may obtain a variation that is of acceleration data within a period of time after the moment t and that is obtained after the smart speaker performs audio cancellation, to recognize a slap action.

In some examples, the processor 401 of the smart speaker may obtain variations that are of magnitudes of accelerations of the smart speaker on the XOY plane at n moments after the moment t and that are obtained after the smart speaker performs audio cancellation, that is, obtain n $d'_{xy}$s, for example, $$d_{xy}^{\prime(t+1)}, d_{xy}^{\prime(t+2)} \ldots d_{xy}^{\prime(t+n)}.$$

It should be noted that a determining process of $$d_{xy}^{\prime(t+n)}$$

is similar to a determining process of $$d_{xy}^{\prime(t)}.$$

For specific implementation, refer to corresponding content in S502 and S503. For example, a waveform of acceleration data that is of the smart speaker and that is collected by the acceleration sensor 402 of the smart speaker is shown in (a) of (A) in FIG. 7. In the audio play scenario, a waveform of audio data retrieved by the smart speaker is shown in (b) in (A) in FIG. 7. After the processor 401 of the smart speaker determines that the variation that is of the magnitude of the acceleration of the smart speaker on the XOY plane at the moment t and that is obtained after the smart speaker performs audio cancellation is greater than a preset threshold, the processor 401 of the smart speaker may obtain, acceleration data that is of the smart speaker and that is collected by the acceleration sensor 402 at n moments after the moment t, and determine, based on the obtained acceleration data, variations of magnitudes of accelerations on the XOY plane at the moments. For example, based on the waveform in (a) in (A) in FIG. 7, the determined variations of the magnitudes of the accelerations of the smart speaker on the XOY plane at the moments is shown in (c) in (A) in FIG. 7. In addition, the processor 401 of the smart speaker may determine, based on the retrieved audio data, interference data at the n moments after the moment t. For example, based on the waveform of the audio data shown in (b) in (A) in FIG. 7, the interference data that is determined by the smart speaker and that is at the n moments after the moment t is shown in (d) in (A) in FIG. 7. Then, audio cancellation may be performed, based on the interference data at the n moments after the moment t, on variations of magnitudes of accelerations on the XOY plane at corresponding moments. In this way, the smart speaker may obtain variations that are of the magnitudes of the accelerations of the smart speaker on the XOY plane at the n moments after the moment t and that are obtained after the smart speaker performs audio cancellation. For example, an obtained result may be shown in (e) in (A) in FIG. 7. It can be seen that, the smart speaker may remove, based on the retrieved audio data, interference caused by an audio to the acceleration data collected by the acceleration sensor 402.

Generally, a slap performed by the user on the smart speaker also causes a change of a magnitude of an acceleration of the smart speaker on the Z-axis of the predefined coordinate system. Therefore, the processor 401 of the smart speaker may further obtain variations of magnitudes of accelerations of the smart speaker on the Z-axis of the predefined coordinate system at the n consecutive moments after the moment t, that is, obtain n $d_z$ s, for example, $$d_z^{(t+1)}, d_z^{(t+2)} \ldots d_z^{(t+n)}.$$

A determining process of $$d_z^{(t+n)}$$

is similar to a determining process of $$d_z^{(t)}.$$

For specific implementation, refer to specific descriptions of corresponding content in S502. Details are not described herein again.

In addition, as described in the foregoing embodiment, a movement of the smart speaker caused by the user also causes vibration of the smart speaker. To avoid impact of the movement on recognition of the slap action, or prevent the movement from being incorrectly recognized as the slap action by the smart speaker, the smart speaker needs to be able to detect a movement operation performed by the user on the smart speaker. Detection of the movement operation may include detection of a horizontal movement and a vertical movement. The variation of the magnitude of the acceleration of the smart speaker on the Z-axis may be further used to recognize the vertical movement. The variation that is of the magnitude of the acceleration of the smart speaker on the XOY plane and that is obtained after the smart speaker performs audio cancellation may be further used to recognize the horizontal movement. For specific recognition of the vertical movement and the horizontal movement, refer to descriptions of S507.

S507: The processor 401 of the smart speaker determines, based on the first variation and the second variation, whether the user performs the slap action on the smart speaker.

In this embodiment, waveform recognition functions $C_{xy}(\bullet)$ and $C_z(\bullet)$ may be pre-stored in the smart speaker.

The processor 401 of the smart speaker obtains the first variations that are of the magnitudes of the accelerations of the smart speaker on the XOY plane of the predefined coordinate system at the n consecutive moments after the moment t and that are obtained after the smart speaker performs audio cancellation, namely, $$d_{xy}'^{(t+1)}, d_{xy}'^{(t+2)} \ldots d_{xy}'^{(t+n)},$$

and the second variations of the magnitudes of the accelerations of the smart speaker on the Z-axis of the predefined coordinate system at the n consecutive moments after the moment t, namely, $$d_z'^{(t+1)}, d_z'^{(t+2)} \ldots d_z'^{(t+n)}.$$

After respectively inputting the first variations and the second variations into the waveform recognition functions $C_{xy}(\bullet)$ and $C_z(\bullet)$, the processor 401 of the smart speaker may determine, based on outputs of the waveform recognition functions $C_{xy}(\bullet)$ and $C_z(\bullet)$, whether the user performs the slap action on the smart speaker.

The slap action and the horizontal movement may be recognized based on input data by using $C_{xy}(\bullet)$; and the output of $C_{xy}(\bullet)$ may include the horizontal movement, the slap action, and the no action. The vertical movement may be recognized based on input data by using $C_z(\bullet)$; and the output of $C_z(\bullet)$ may include vertical movement and no action.

For example, the processor 401 of the smart speaker may input $$d_{xy}'^{(t+1)}, d_{xy}'^{(t+2)} \ldots d_{xy}'^{(t+n)}$$

into the waveform recognition function $C_{xy}(\bullet)$, that is, input $$\left[d_{xy}'^{(t+1)}, d_{xy}'^{(t+2)} \ldots d_{xy}'^{(t+n)}\right]$$

into the waveform recognition function $C_{xy}(\bullet)$, to recognize the slap action and the horizontal movement. The processor 401 of the smart speaker inputs $$d_z'^{(t+1)}, d_z'^{(t+2)} \ldots d_z'^{(t+n)}$$

into the waveform recognition function $C_z(\bullet)$, that is, inputs $$\left[d_z'^{(t+1)}, d_z'^{(t+2)} \ldots d_z'^{(t+n)}\right]$$

into the waveform recognition function $C_z(\bullet)$, to recognize the vertical movement.

In some examples, the waveform recognition function $C_{xy}(\bullet)$ may include Function (1) and Function (2). Function (1) is as follows:

$$\begin{cases} d_{xy}'^{(t+i)} - d_{xy}'^{(t+i-1)} > T_{slap} \\ d_{xy}'^{(t+i)} - d_{xy}'^{(t+i+1)} > T_{slap} \end{cases}. \quad \text{Function (1)}$$

In Function (1), $T_{slap}>0$, a value of $T_{slap}$ may be selected based on experience, and $T_{slap}$ is a preset value. For example, the value of $T_{slap}$ may be $5\times10^4$ micrometers per square second ($\mu m/s^2$). Function (1) may be used to determine whether a peak occurs in $$\left[d_{xy}'^{(t+1)}, d_{xy}'^{(t+2)} \ldots d_{xy}'^{(t+n)}\right].$$

When a variation of acceleration data at a moment is greater than a variation of acceleration data at a moment before and after the moment, and a difference is greater than a threshold $T_{slap}$, it is considered that the peak occurs in the variation of the acceleration data at the moment. When the peak occurs in $$\left[d_{xy}'^{(t+1)}, d_{xy}'^{(t+2)} \ldots d_{xy}'^{(t+n)}\right],$$

it may be considered that the user performs a slap.

Figure 9:
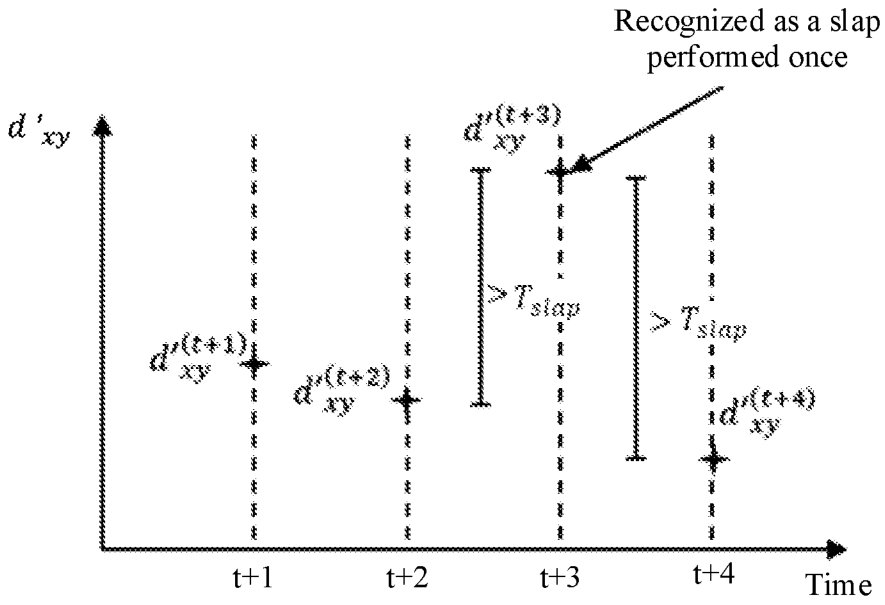
FIG. 9 is a schematic diagram of a principle of recognizing a slap action in data recognition shown in FIG. 7.

For example, with reference to FIG. 9, when $$d_{xy}'^{(t+3)} - d_{xy}'^{(t+2)} > T_{slap} \text{ and } d_{xy}'^{(t+3)} - d_{xy}'^{(t+4)} > T_{slap},$$

it may be considered that the user performs a slap. In an example, with reference to FIG. 7, after data of a waveform shown in (e) in (A) in FIG. 7 is input into the waveform recognition function $C_{xy}(\bullet)$, as shown in (f) in (A) in FIG. 7, two peaks occurring in $$\left[d_{xy}'^{(t+1)}, d_{xy}'^{(t+2)} \ldots d_{xy}'^{(t+n)}\right]$$

may be recognized, that is, the user performs two slaps. Function (2) is as follows:

$$\bar{s}_{xy} > T_{move\text{-}xy} \quad \text{Function (2).}$$

In Function (2), $T_{move\text{-}xy}>0$, a value of $T_{move\text{-}xy}$ may be selected based on experience, and $T_{move\text{-}xy}$ is a preset value.

$$\bar{s}_{xy} = \frac{1}{n}\sum_{i=1}^{n}\left(d_{xy}'^{(t+i)}\right),$$

and is an accumulated value of all data in $$\left[d_{xy}'^{(t+1)}, d_{xy}'^{(t+2)} \ldots d_{xy}'^{(t+n)}\right].$$

When $\bar{s}_{xy}$ is greater than the threshold $T_{move\text{-}xy}$, it may be considered that the smart speaker performs the horizontal movement. When $\bar{s}_{xy}$ is not greater than the threshold $T_{move\text{-}xy}$, it may be considered that no horizontal movement is performed.

The waveform recognition function $C_z(\bullet)$ may include the following Function (3):

$$\bar{s}_z > T_{move\text{-}z} \quad \text{Function (3).}$$

In Function (3), $T_{move\text{-}z}>0$, and a value of $T_{move\text{-}z}$ may be selected based on experience.

$$\bar{s}_z = \frac{1}{n}\sum\nolimits_{i=1}^{n}\left(d_z'^{(t+i)}\right),$$

and is an accumulated value of all data in $$\left[d_{xy}'^{(t+1)}, d_{xy}'^{(t+2)} \ldots d_{xy}'^{(t+n)}\right].$$

When $\bar{s}_z$ is greater than the threshold $T_{move\text{-}z}$, it may be considered that the smart speaker performs the vertical movement. When $\bar{s}_z$ is not greater than the threshold $T_{move\text{-}z}$, it may be considered that no vertical movement is performed.

In other words, Function (1) may be used to recognize the slap action, Function (2) may be used to recognize the horizontal movement, and Function (3) may be used to recognize the vertical movement.

In this embodiment, if the input data meets only Function (1), the output of the waveform recognition function $C_{xy}(\bullet)$ is the slap action. If the input data meets only Function (2), the output of the waveform recognition function $C_{xy}(\bullet)$ is the horizontal movement. For example, after data of a waveform shown in (h) in (B) in FIG. 7 is input into the waveform recognition function $C_{xy}(\bullet)$, the output of the waveform recognition function $C_{xy}(\bullet)$ is the horizontal movement. If the input data meets both Function (1) and Function (2), the output of the waveform recognition function $C_{xy}(\bullet)$ is the horizontal movement. This can prevent a horizontal movement operation performed by the user on the smart speaker from being incorrectly recognized as the slap action. If the input data does not meet Function (1) and Function (2), the output of the waveform recognition function $C_{xy}(\bullet)$ is no action. For example, after data of a waveform shown in (g) in (B) in FIG. 7 is input into the waveform recognition function $C_{xy}(\bullet)$, the output of the waveform recognition function $C_{xy}(\bullet)$ is no action.

If the input data meets Function (3), the output of the waveform recognition function $C_z(\bullet)$ is the vertical movement. If the input data does not meet Function (3), the output of the waveform recognition function $C_z(\bullet)$ is no action.

Then, the processor 401 of the smart speaker may determine, based on the outputs of the waveform recognition functions $C_{xy}(\bullet)$ and $C_z(\bullet)$, whether the user performs the slap action on the smart speaker.

For example, when the output of the waveform recognition function $C_{xy}(\bullet)$ is the slap action, and the output of the waveform recognition function $C_z(\bullet)$ is no action, the processor 401 of the smart speaker may determine that the user performs the slap action.

When the output of the waveform recognition function $C_{xy}(\bullet)$ is the slap action, and the output of the waveform recognition function $C_z(\bullet)$ is the vertical movement, the processor 401 of the smart speaker may determine that the user lifts up the smart speaker but does not perform the slap action. This can prevent a vertical movement operation performed by the user on the smart speaker from being incorrectly recognized as the slap action.

When the output of the waveform recognition function $C_{xy}(\bullet)$ is the horizontal movement, and the output of the waveform recognition function $C_z(\bullet)$ is no action, the processor 401 of the smart speaker may determine that the user performs the horizontal movement on the smart speaker but does not perform the slap action.

When the output of the waveform recognition function $C_{xy}(\bullet)$ is the horizontal movement, and the output of the waveform recognition function $C_z(\bullet)$ is the vertical movement, or when the output of the waveform recognition function $C_{xy}(\bullet)$ is no action, and the output of the waveform recognition function $C_z(\bullet)$ is the vertical movement, the processor 401 of the smart speaker may determine that the user lifts up the smart speaker but does not perform the slap action. In some other examples, $C_{xy}(\bullet)$ may alternatively be a neural network model, and the neural network model has a function of recognizing a horizontal movement and a slap based on input data. Similarly, $C_z(\bullet)$ may alternatively be a neural network model, and the neural network model has a function of recognizing a vertical movement based on input data. In this way, after $$d_{xy}'^{(d+1)}, d_{xy}'^{(d+2)} \ldots d_{xy}'^{(t+n)} \text{ and } d_z'^{(t+1)}, d_z'^{(t+2)} \ldots d_z'^{(t+n)}$$

are input into the corresponding neural network models, corresponding results may be output, so that the processor 401 of the smart speaker determines, based on the output corresponding results, whether the user performs the slap action on the smart speaker. A neural network module may be generated in advance through training based on a large amount of sample data.

In some embodiments, recognition of the vertical movement, the horizontal movement, and the slap action may be performed in a predetermined sequence. The processor 401 of the smart speaker may first input $$d_z'^{(t+1)}, d_z'^{(t+2)} \ldots d_z'^{(t+n)}$$

into $C_z(\bullet)$, to recognize the vertical movement. If the output result is the vertical movement, the processor 401 of the smart speaker may determine that the user does not perform the slap action. Then, the smart speaker may determine, based on a change of acceleration data collected by the acceleration sensor 402 at a next moment, whether to trigger recognition of the slap action. If the output result is no action, the processor 401 of the smart speaker may input $$d_{xy}'^{(t+1)}, d_{xy}'^{(t+2)} \ldots d_{xy}'^{(t+n)}$$

into $C_{xy}(\bullet)$, to recognize the horizontal movement first. For example, the processor 401 of the smart speaker first determines, by using Function (2), whether the user performs the horizontal movement on the smart speaker. If it is determined that the user does not perform the horizontal movement on the smart speaker, the slap action is recognized based on $$d_{xy}'^{(t+1)}, d_{xy}'^{(t+2)} \ldots d_{xy}'^{(t+n)}.$$

For example, $$d_{xy}'^{(t+1)}, d_{xy}'^{(t+2)} \ldots d_{xy}'^{(t+n)}$$

is input into Function (1) to determine whether the user performs the slap action. In this way, power consumption of the smart speaker can be reduced.

Optionally, in an embodiment, a corresponding first function may be performed after a first action is recognized; and a second function corresponding to a second action is performed after the second action is recognized in a process of performing the first function. In a process of performing the second function, if performing the second function conflicts with performing the first function, the second function is first performed; or if performing the second function does not conflict with performing the first function, the second function is first performed, or the first function and the second function are synchronously performed. That the second function is first performed includes but is not limited to: no longer performing the first function after the second function is performed, and continuing to perform the first function after the second function is performed. For example, when the user horizontally moves the smart speaker, the smart speaker may recognize that the user performs the horizontal movement on the smart speaker, and the smart speaker may send a voice prompt "The speaker is in a horizontal movement". In a process in which the user moves the smart speaker, if the user or another user slaps the smart speaker, the smart speaker recognizes that a light strip is to be turned on. In this case, the light strip of the smart speaker is turned on, to turn on lighting. In this way, in a process in which the smart speaker is moved, the smart speaker may synchronously send the foregoing voice prompt, and turn on the light strip, to turn on a lighting function. The technical solution is applicable to a scenario in which a user moves at night, and the like.

Further, a third action and a third function corresponding to the third action may be further set. Similarly, the foregoing manner is extended to the third action and the third function corresponding to the third action.

For example, with reference to FIG. 4, S507 may be performed by the processing module included in the processor 401.

S508: When the processor 401 of the smart speaker determines that the user performs the slap action, the processor 401 of the smart speaker performs a corresponding function, or the smart speaker sends a control event corresponding to the slap action to another device, so that the device performs a corresponding function.

In some embodiments of this application, with reference to FIG. 4, after determining that the user performs the slap action, the processor 401, for example, the processing module, of the smart speaker may send the corresponding control event to a control module, so that the control module performs the corresponding function. For example, the control module controls turning on/turning off of the light strip 406. If the processor 401 of the smart speaker determines that the user does not perform the slap action, the processor 401 of the smart speaker may continue to obtain acceleration data collected by the acceleration sensor 402 at a next moment, to determine, based on a change of the acceleration data, whether to trigger recognition of the slap action.

In the foregoing, descriptions are provided by using an example in which the user, by performing the slap action, controls turning on/turning off of the light strip of the smart speaker. In some other embodiments, in response to the slap action, the smart speaker may alternatively perform another function, to control the another function of the smart speaker. In response to the slap action, a function performed by the smart speaker may be preconfigured in the smart speaker. This is not specifically limited herein in this embodiment.

Alternatively, the smart speaker may perform different functions based on different usage scenarios of the smart speaker when the user performs the slap action. For example, when the user uses a call function of the smart speaker, for example, answering a call, the smart speaker recognizes that the user performs the slap action. In this case, the smart speaker may hang up the call. For another example, when the user plays an audio by using the smart speaker, the smart speaker recognizes that the user performs the slap action. In this case, the smart speaker may pause playing music. When recognizing that the user performs a slap action again, the smart speaker starts to play the music again. For another example, when an alarm clock of the smart speaker is ringing, the smart speaker recognizes that the user performs the slap action. In this case, the smart speaker may pause or delay ringing. Different control functions may be implemented by different control modules. In other words, after determining that the user performs the slap action, the processor 401, for example, the processing module, of the smart speaker may send a corresponding control event to a corresponding control module, to perform a corresponding function. For example, the control event is sent to a light strip control module to control turning of/turning off of a light strip, is sent to a play control module to control audio pause or play, is sent to an alarm clock module to control pause and delay ringing of an alarm clock, and is sent to a call service module to control answering or hanging up of a call.

Alternatively, the smart speaker may perform different functions based on different quantities of slaps when the user performs the slap action. For example, when recognizing that the user slaps the smart speaker once, the smart speaker controls turning on/turning off of the light strip of the smart speaker. When recognizing that the user slaps the smart speaker twice, the smart speaker increases a volume of the smart speaker.

The foregoing waveform recognition function $C_{xy}(\bullet)$ further has a function of recognizing a quantity of slaps. For example, when one peak occurs in data in an array $$\left[d_{xy}'^{(t+1)}, d_{xy}'^{(t+2)} \ldots d_{xy}'^{(t+n)}\right],$$

it may be recognized that the quantity of slaps is 1. When two peaks occur in the data in the array $$\left[d_{xy}'^{(t+1)}, d_{xy}'^{(t+2)} \ldots d_{xy}'^{(t+n)}\right],$$

it may be recognized that the quantity of slaps is 2. The rest may be deduced by analogy.

In some other embodiments of this application, the smart speaker may control another smart home device at a home of the user based on a recognized slap action. For example, with reference to FIG. 2, after recognizing the slap action of the user based on the change of the acceleration data collected by the acceleration sensor, the smart speaker may control turning on/turning off of a smart screen at home, and the like.

Figure 10:
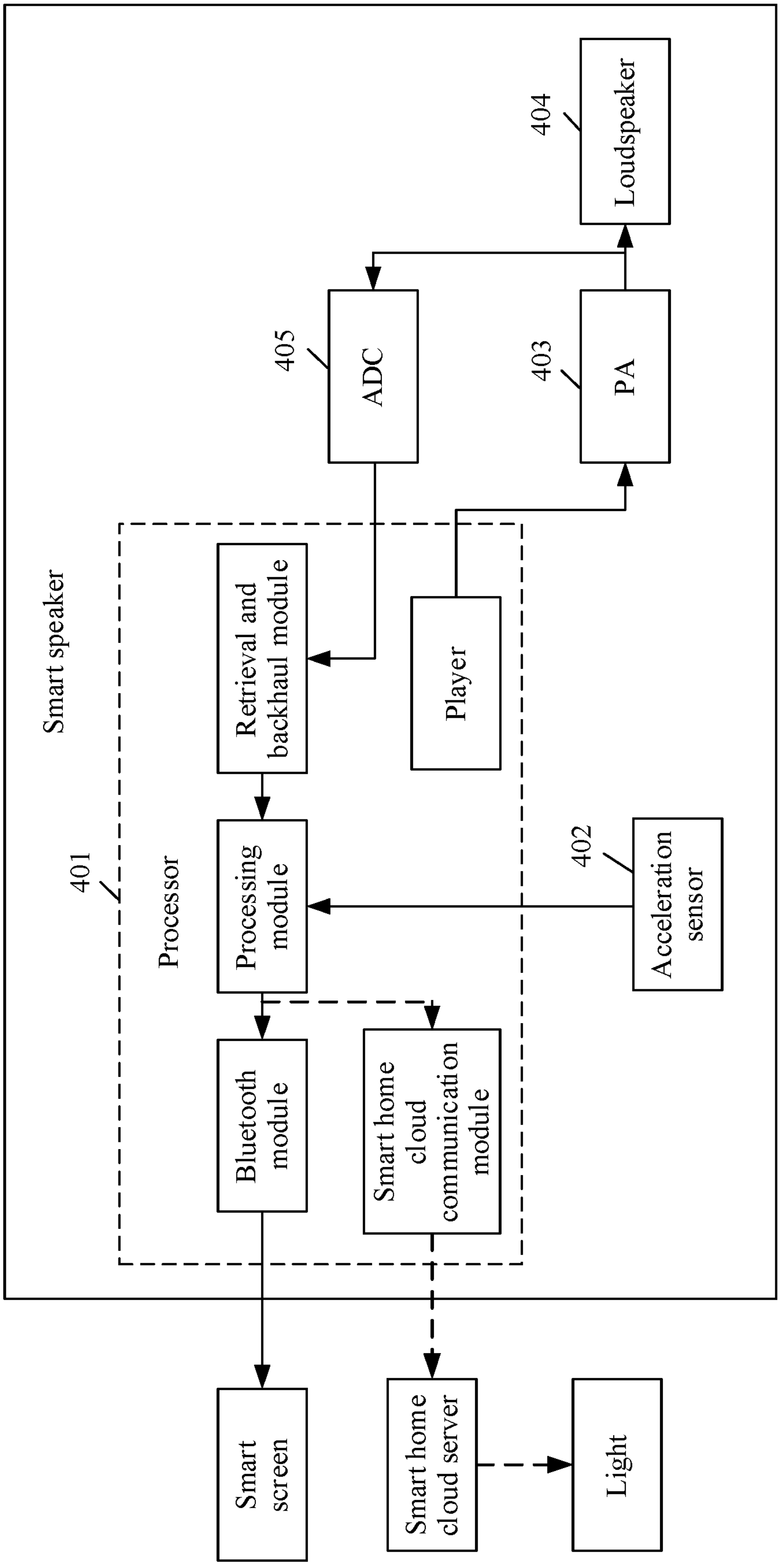
FIG. 10 is a schematic diagram of a structure of another smart speaker according to an embodiment of this application.

In some examples, with reference to FIG. 2 and FIG. 4, as shown in FIG. 10, the smart speaker establishes a Bluetooth connection to a smart screen through Bluetooth, and a slap action is used to control turning on/turning off of the smart screen. The acceleration sensor 402 of the smart speaker may periodically collect acceleration data of the smart speaker and report the acceleration data to the processing module of the processor 401 of the smart speaker. In the audio play scenario, the retrieval and backhaul module of the processor 401 of the smart speaker may obtain corresponding interference data and transmit the interference data to the processing module.

The processing module of the processor 401 of the smart speaker performs, based on the interference data, audio cancellation on a change of the acceleration data collected by the acceleration sensor 402, and then performs waveform recognition, so that the slap action of the user can be accurately recognized.

In some examples, refer to FIG. 10. After the processing module of the smart speaker recognizes the slap action of the user, the processing module of the smart speaker may send a corresponding control event to a Bluetooth module, so that the Bluetooth module sends the control event to the smart screen through the Bluetooth connection established between the smart speaker and the smart screen, to control turning on/turning off of the smart screen.

Alternatively, in some other examples, still refer to FIG. 10. When the smart speaker does not establish a connection, for example, the foregoing Bluetooth connection, to another smart home device, after the processing module of the smart speaker recognizes the slap action of the user, the processing module of the smart speaker may send a corresponding control event to a smart home cloud communication module, so that the smart home cloud communication module sends the control event to a corresponding smart home device, for example, a light at home, by using a smart home cloud server, to control turning on/turning off of the light.

Certainly, the smart speaker may alternatively control different smart home devices based on different quantities of slaps when the user performs a slap action. For example, when recognizing that the user slaps the smart speaker once, the smart speaker controls turning on/turning off of the light at home; and when recognizing that the user slaps the smart speaker twice, the smart speaker controls turning on/turning off of a vacuum cleaning robot. During specific implementation, after recognizing the slap action, the smart speaker may send a control event and a quantity of slaps to the smart home cloud server by using the smart home cloud communication module, and the smart home cloud server controls different smart home devices based on the different quantities of slaps.

S510: At the n consecutive moments after the moment t, the processor 401 of the smart speaker obtains the second variations of the magnitudes of the accelerations of the smart speaker on the Z-axis of the predefined coordinate system.

S511: The processor 401 of the smart speaker determines, based on the second variations, whether the user performs the vertical movement on the smart speaker.

It should be noted that specific descriptions of obtaining the second variation in S510 are the same as descriptions of corresponding content in S506, and specific descriptions of determining whether the user performs the vertical movement on the smart speaker in S511 is the same as descriptions of corresponding content in S507. Details are not described herein again.

It should be noted that S510 and S511 are also optional steps. If in S505, determining is performed only on whether $$d_{xy}^{\prime(t)}$$

is greater than the first preset threshold, to determine whether to trigger recognition of the slap action, the control method in an embodiment of this application does not include S510 and S511.

According to the method provided in embodiments of this application, the smart speaker may recognize, by using the disposed acceleration sensor, a slap action performed by the user on the smart speaker, and may perform a corresponding function based on the slap action, for example, controlling turning on/turning off of the light strip of the smart speaker device, controlling play and pause of music, controlling pause and delay ringing of an alarm clock, controlling answering and hanging up of a call, or controlling another smart home device. In this way, the user can implement corresponding control by slapping the electronic device. This reduces operation complexity, improves operation flexibility of the electronic device, and improves user experience. Especially for a smart speaker on which a light strip is disposed, turning on/turning off of the light strip of the smart speaker may be controlled by slapping the smart speaker, so that the user can control turning on/turning off of the light strip in a scenario with poor light, for example, at night. This greatly improves user experience. In addition, a physical button used to control a related function does not need to be disposed on the smart speaker, so that aesthetics of an appearance design of the speaker device is improved.

In addition, audio cancellation is performed on the acceleration data collected by the acceleration sensor, so that impact of audio play on accuracy of recognizing a slap action can be eliminated in the audio play scenario, incorrect recognition is avoided, and accuracy of controlling the smart speaker is improved.

It should be noted that, although in the foregoing embodiment, the electronic device is described by using the smart speaker as an example, a person skilled in the art should understand that the electronic device in this application includes a device that generates vibration when performing at least one original function. In other words, the electronic device in this application includes but is not limited to a smart speaker.

It should be noted that all or some of embodiments of this application may be freely and randomly combined. A combined technical solution also falls within the scope of this application.

It may be understood that, to implement the foregoing functions, the electronic device includes corresponding hardware structures and/or software modules for performing the functions. A person skilled in the art should be aware that, with reference to the units and algorithm steps in the examples described in embodiments disclosed in this specification, embodiments of this application can be implemented by hardware or a combination of hardware and computer software.

Whether a function is performed by hardware or hardware driven by computer software depends on a particular application and a design constraint condition that are of a technical solution. A person skilled in the art may use different methods to implement the described functions for each particular application, but it should not be considered that the implementation goes beyond the scope of embodiments of this application.

In embodiments of this application, the electronic device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 11:
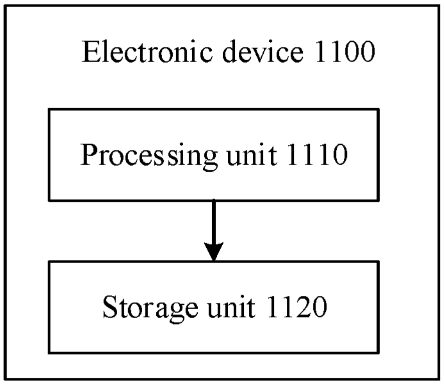
FIG. 11 is a schematic diagram of a structure of an electronic device according to an embodiment of this application.

In an example, refer to FIG. 11. FIG. 11 is a possible schematic diagram of a structure of the electronic device in the foregoing embodiment. The electronic device 1100 includes a processing unit 1110 and a storage unit 1120.

The processing unit 1110 is configured to perform the method in embodiments of this application.

The storage unit 1120 is configured to store program code and data of the electronic device 1100. For example, the methods in embodiments of this application may be stored in the storage unit 1120 in a form of a computer program.

Certainly, units and modules in the electronic device 1100 include but are not limited to the processing unit 1110 and the storage unit 1120. For example, the electronic device 1100 may further include a power supply unit and the like. The power supply unit is configured to supply power to the electronic device 1100.

The processing unit 1110 may be a processor or a controller, for example, may be a central processing unit (central processing unit, CPU), a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The storage unit 1120 may be a memory.

An embodiment of this application further provides a computer-readable storage medium. The computer-readable storage medium stores computer program code. When a processor executes the computer program code, an electronic device performs the methods in the foregoing embodiments.

An embodiment of this application further provides a computer program product. When the computer program product runs on a computer, the computer is enabled to perform the methods in the foregoing embodiments.

The electronic device 1100, the computer-readable storage medium, or the computer program product provided in embodiments of this application is configured to perform the corresponding methods provided above. Therefore, for beneficial effects that can be achieved by the electronic device 1100, the computer-readable storage medium, or the computer program product, refer to the beneficial effects of the corresponding methods provided above. Details are not described herein again.

The descriptions in the foregoing implementations allow a person skilled in the art to clearly understand that, for the purpose of convenient and brief description, division of the foregoing functional modules is merely used as an example for illustration. In actual application, the foregoing functions can be allocated to different modules and implemented based on a requirement. In other words, an inner structure of an electronic device is divided into different functional modules to implement all or some of the functions described above.

In several embodiments provided in this application, it should be understood that the disclosed electronic device and method may be implemented in another manner. The described electronic device embodiment is merely an example. For example, the module or unit division is merely logical function division and may be other division in actual implementation. For example, a plurality of units or components may be combined or integrated into another electronic device, or some features may be ignored or not performed. In addition, the displayed or discussed mutual couplings or direct couplings or communication connections may be implemented through some interfaces. The indirect couplings or communication connections between electronic devices or units may be implemented in electrical, mechanical, or other forms.

In addition, functional units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software functional unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, for example, a USB flash drive, a removable hard disk, a ROM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A control method, applied to a first electronic device, wherein the first electronic device generates a vibration when performing at least one function, the first electronic device comprises an acceleration sensor and a feedback circuit, the acceleration sensor is configured to output acceleration data related to one or more vibrations of the first electronic device, the feedback circuit is configured to collect and feed back data related to the at least one function, and the method comprises:

obtaining, by the first electronic device, a variation of a magnitude of the acceleration data and interference data based on the acceleration data and the feed back data related to the least one function, the interference data being related to the at least one function;

obtaining, by the first electronic device based on the variation of the magnitude of the acceleration data and the interference data, a variation obtained after data processing;

performing, by the first electronic device in response to a prerequisite that the variation obtained after data processing meets a preset condition, action recognition based on the variation obtained after data processing; and performing, by the first electronic device, a corresponding function based on a recognition result;

or controlling, by the first electronic device based on a recognition result, a second electronic device to perform a corresponding function, wherein the preset condition comprises at least one of:

at a moment t, a first variation, that is of a magnitude of an acceleration of the first electronic device on an XOY plane of a preset coordinate system and that is obtained after the first electronic device performs data processing, is greater than a first preset threshold; or at a moment t, a second variation, that is of a magnitude of an acceleration of the first electronic device on a Z-axis of a preset coordinate system and that is obtained after the first electronic device performs data processing, is greater than a second preset threshold; wherein the moment t is a moment that meets a preset requirement after a timing start point starts.

2. The method of claim 1, wherein that the first electronic device obtains the variation of the magnitude of the acceleration data and the interference data is performed in response to receiving an input by the first electronic device, or in response to performing the at least one function by the first electronic device.

3. The method of claim 1, wherein the at least one function comprises an audio play function, and the data related to the at least one function comprise audio data.

4. The method of claim 3, wherein the audio data are obtained based on audio energy in a period of time.

5. The method of claim 1, wherein the moment t that meets the preset requirement is greater than or equal to t1, wherein t1 is a corresponding moment at which M is equal to preset M1, M is a quantity of pieces of acceleration data that are output by the acceleration sensor starting from the timing start point, and one piece of the acceleration data may be represented as $[a_x, a_y, a_z]^{(t)}$; and the timing start point is a moment at which the first electronic device is powered on.

6. A first electronic device, comprising:

a feedback circuit configured to collect and feed back data related to at least one function of the first electronic device;

an acceleration sensor configured to output acceleration data related to one or more vibrations of the first electronic device, the one or more vibrations including a vibration generated by the at least one function when running the at least one function;

one or more processor; and a memory storing a computer program that, when executed by the one or more processor, cause the first electronic device to perform the operations:

obtaining a variation of a magnitude of the acceleration data and interference data based on the acceleration data and the feed back data related to at least one function, the interference data being related to the at least one function;

obtaining based on the variation of the magnitude of the acceleration data and the interference data, a variation obtained after data processing;

performing action recognition based on the variation obtained after data processing in response to a prerequisite that the variation obtained after data processing meets a preset condition; and performing a corresponding function based on a recognition result; or controlling, based on a recognition result, a second electronic device to perform a corresponding function, wherein the preset condition comprises at least one of:

at a moment t, a first variation, that is of a magnitude of an acceleration of the first electronic device on an XOY plane of a preset coordinate system and that is obtained after the first electronic device performs data processing, is greater than a first preset threshold; or at a moment t, a second variation, that is of a magnitude of an acceleration of the first electronic device on a Z-axis of a preset coordinate system and that is obtained after the first electronic device performs data processing, is greater than a second preset threshold; wherein the moment t is a moment that meets a preset requirement after a timing start point starts.

7. The first electronic device of claim 6, wherein the variation of the magnitude of the acceleration data and the interference data are obtained in response to receiving an input by the first electronic device, or in response to performing the at least one function by the first electronic device.

8. The first electronic device of claim 6, wherein the at least one function comprises an audio play function, and the data related to the at least one function comprise audio data.

9. The first electronic device of claim 8, wherein the audio data are obtained based on audio energy in a period of time.

10. The first electronic device of claim 6, wherein the moment t that meets the preset requirement is greater than or equal to t1, wherein t1 is a corresponding moment at which M is equal to preset M1, M is a quantity of pieces of acceleration data that are output by the acceleration sensor starting from the timing start point, and one piece of the acceleration data may be represented as $[a_x, a_y, a_z]^{(t)}$; and the timing start point is a moment at which the first electronic device is powered on.

11. A non-transitory computer-readable storage medium, wherein the computer-readable storage medium comprises a computer program, and when the computer program is run on a first electronic device, the first electronic device comprises a feedback circuit and an acceleration sensor, the feedback circuit is configured to collect and feed back data related to the at least one function, the acceleration sensor is configured to output acceleration data related to one or more vibrations of the first electronic device, the one or more vibration including a vibration generated by the at least one function, the first electronic device to perform the operations:

obtaining a variation of a magnitude of the acceleration data and interference data based on the acceleration data and the feed back data related to at least one function, the interference data being related to the at least one function;

obtaining based on the variation of the magnitude of the acceleration data and the interference data, a variation obtained after data processing;

performing action recognition based on the variation obtained after data processing in response to a prerequisite that the variation obtained after data processing meets a preset condition; and performing a corresponding function based on a recognition result; or controlling, based on a recognition result, a second electronic device to perform a corresponding function, wherein the preset condition comprises at least one of:

at a moment t, a first variation, that is of a magnitude of an acceleration of the first electronic device on an XOY plane of a preset coordinate system and that is obtained after the first electronic device performs data processing, is greater than a first preset threshold; or at a moment t, a second variation, that is of a magnitude of an acceleration of the first electronic device on a Z-axis of a preset coordinate system and that is obtained after the first electronic device performs data processing, is greater than a second preset threshold; wherein the moment t is a moment that meets a preset requirement after a timing start point starts.

12. The non-transitory computer-readable storage medium of claim 11, wherein the variation of the magnitude of the acceleration data and the interference data are obtained in response to receiving an input by the first electronic device, or in response to performing the at least one function by the first electronic device.

13. The non-transitory computer-readable storage medium of claim 11, wherein the at least one function comprises an audio play function, and the data related to the at least one function comprise audio data.

14. The non-transitory computer-readable storage medium of claim 13, wherein the audio data are obtained based on audio energy in a period of time.

* * * * *